(12) United States Patent
Ovadia

(10) Patent No.: US 7,277,634 B2
(45) Date of Patent: Oct. 2, 2007

(54) METHOD AND APPARATUS OF A SEMICONDUCTOR-BASED FAST INTELLIGENT NXN PHOTONIC SWITCH MODULE WITH AN OPTICAL BUFFER FOR WDM NETWORKS

(75) Inventor: Shlomo Ovadia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 638 days.

(21) Appl. No.: 10/183,111

(22) Filed: Jun. 25, 2002

(65) Prior Publication Data

US 2004/0208544 A1 Oct. 21, 2004

Related U.S. Application Data

(63) Continuation-in-part of application No. 10/126,091, filed on Apr. 17, 2002.

(51) Int. Cl.
*H04J 14/00* (2006.01)

(52) U.S. Cl. .......................... 398/45; 398/47

(58) Field of Classification Search .............. 359/128, 359/124, 123; 398/84, 45–58, 75, 66, 98; 385/24; 370/466
See application file for complete search history.

(56) References Cited

U.S. PATENT DOCUMENTS

| | | | |
|---|---|---|---|
| 6,519,062 B1 * | 2/2003 | Yoo | 398/49 |
| 6,697,374 B1 * | 2/2004 | Shraga et al. | 370/458 |
| 6,956,868 B2 * | 10/2005 | Qiao | 370/466 |
| 2002/0118419 A1 * | 8/2002 | Zheng et al. | 359/139 |
| 2003/0043430 A1 * | 3/2003 | Handelman | 359/128 |

OTHER PUBLICATIONS

O'Mahony, Mike J., et al., "The Application of Optical Packet Switching in Future Communication Networks", IEEE Communications Magazine, Mar. 2001, pp. 128-135.

Yao, Shun, et al., "All-Optical Packet Switching for Metropolitan Area Networks: Opportunities and Challenges", IEEE Communications Magazine, Mar. 2001, pp. 142-148.

Quiao, Chunming, Dr., et al., "Optical Burst Switching", Business Briefing: Global Photonics Applications & Technology, Nov. 2001, pp. 108-113.

Quaio, Chunming, "Labeled Optical Burst Switching for IP-over-WDM Integration", Optical Networking Solutions for Next-Generation Internet Networks, IEEE Communications Magazine, Sep. 2000, pp. 104-114.

(Continued)

*Primary Examiner*—Jason Chan
*Assistant Examiner*—Quan-Zhen Wang
(74) *Attorney, Agent, or Firm*—Blakely, Sokoloff, Taylor & Zafman LLP

(57) ABSTRACT

An intelligent photonic burst switching (PBS) module for use in a WDM optical switching network includes optical multiplexers and de-multiplexers, an optical receiver array, an optical transmitter array, a PBS fabric, and a control interface unit. The PBS module includes optical buffering in a form of tunable wavelength converters (TWCs) and variable time-delay optical circuits. The PBS module routes the received optical burst labels and network management control labels to the controller and optical burst data in a plurality of input lines, respectively. The optical output lines provide propagation paths for a plurality of TDM channels. More specifically, the controller processes the control signal and, responsive thereto, causes the PBS to route at least a portion of the data signal to one of the TDM channels. When the desired TDM channel is not available, the controller causes a TWC to effectively change the wavelength of at least a portion of the data signal.

23 Claims, 18 Drawing Sheets

OTHER PUBLICATIONS

Carena, A., et al., "OPERA: An Optical Packet Experimental Routing Architecture with Label Swapping Capability", Journal of Lightwave Technology, vol. 16, No. 12, Dec. 1998, IEEE, pp. 2135-2145.

Zhong, Wen De, et al., "A New Wavelength-Routed Photonic Packet Buffer Combining Traveling Delay Lines with Delay-Line Loops", Journal of Lightwave Technology, vol. 19, No. 8, Aug. 2001, IEEE, pp. 1085-1092.

* cited by examiner

OPTICAL BURST PAYLOAD FORMAT

OPTICAL LABEL FORMAT

METHOD AND APPARATUS OF A SEMICONDUCTOR-BASED FAST INTELLIGENT NXN PHOTONIC SWITCH MODULE WITH AN OPTICAL BUFFER FOR WDM NETWORKS

CROSS REFERENCE TO RELATED APPLICATIONS

The present application is a continuation-in-part of U.S. patent application Ser. No. 10/126,091, filed Apr. 17, 2002.

FIELD OF THE INVENTION

An embodiment of the present invention relates to optical networks in general; and, more specifically, to optical buffering of photonic switch fabrics.

BACKGROUND INFORMATION

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing (WDM) technology is used to support the ever-growing demand in optical networks for higher data rates.

Conventional optical switched networks typically use wavelength routing techniques, which require that optical-electrical-optical (OEO) conversion of optical signals is done at the optical switches. OEO conversion at each switching node in the optical network is not only very slow operation (typically about ten milliseconds), but it is very costly, and potentially creates a traffic bottleneck for the optical switched network. In addition, the current optical switch technologies cannot efficiently support "bursty" traffic that is often experienced in packet communication applications (e.g., the Internet).

A large network can be implemented using several sub-networks. For example, a large network to support Internet traffic can be divided into a large number of relatively small access networks operated by Internet service providers (ISPs), which are coupled to a number of metropolitan area networks (Optical MANs), which are in turn coupled to a large "backbone" wide area network (WAN). While the local-area networks (LANs) can be relatively low bandwidth, the optical MANs and WANs typically require high bandwidth in order to provide a level of service demanded by their high-end users.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Figure 1:
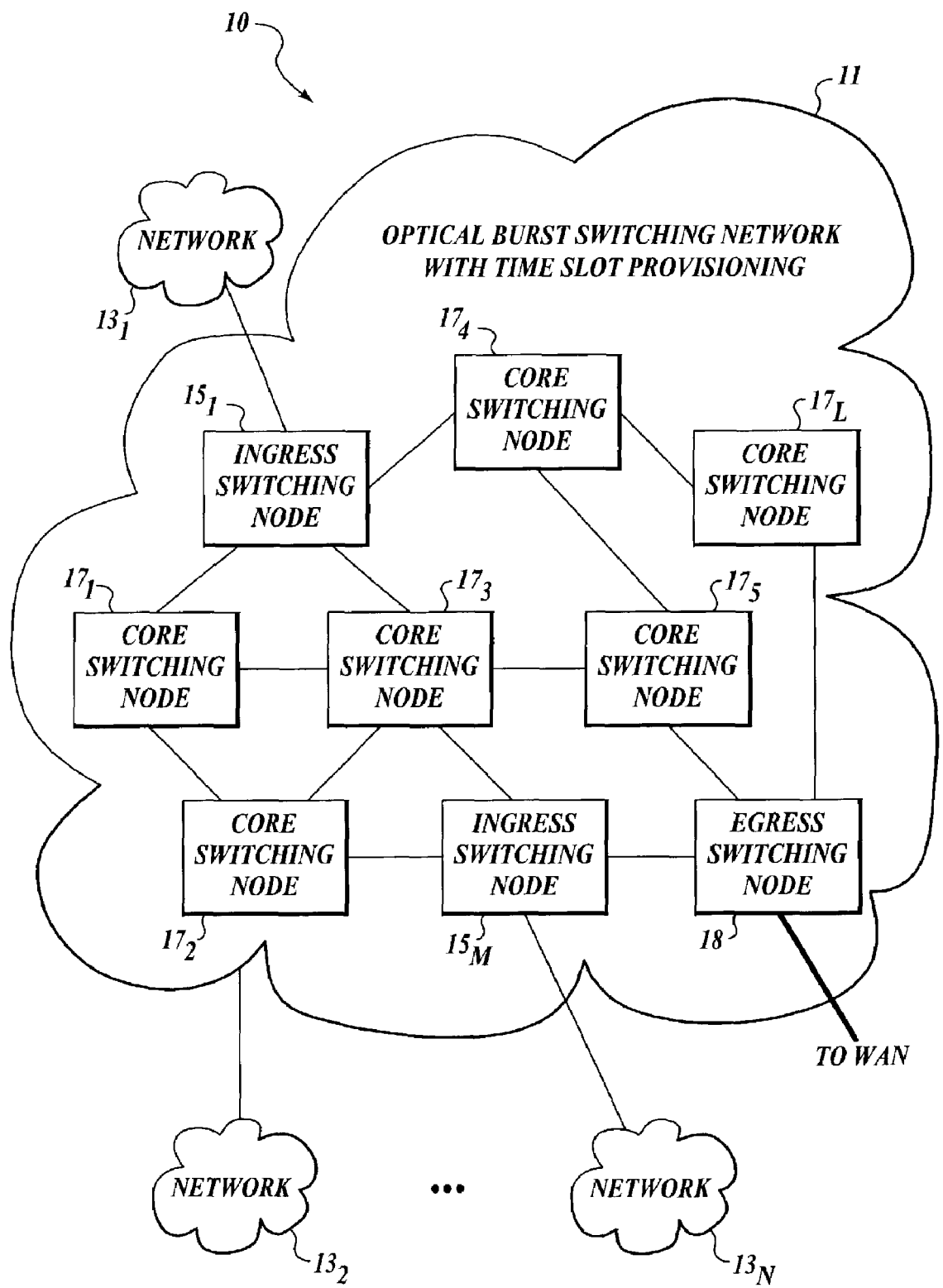
FIG. 1 is a simplified block diagram illustrating a photonic burst switching network, according to one embodiment of the present invention.

FIG. 1 illustrates a photonic burst-switched network 10, according to one embodiment of the present invention. The term photonic burst is used herein to refer to statistically-multiplexed packets (e.g., internet protocol (IP) packets) having similar routing requirements. A photonic burst typically includes a photonic label containing the header and other routing information of the IP packets and a payload containing the data segments of the packets.

This embodiment of photonic burst-switched network 10 includes an optical MAN 11, local area networks (LANs) $13_1$-$13_N$ and a backbone optical WAN (not shown). In addition, this embodiment of optical MAN 11 includes ingress switching nodes $15_1$-$15_M$, core switching nodes $17_1$-$17_L$, and egress switching node 18. Optical MAN 11 can include other ingress and core switching nodes (not shown)

that are interconnected with the switching nodes shown in FIG. 1. In this embodiment, the ingress, egress and core switching nodes are implemented with intelligent modules.

In this embodiment, ingress switching nodes $15_1$-$15_M$ are implemented as label switch routers (LSR) with the appropriate optical interface units or modules, where each is configured to receive IP packets from a LAN (via a label switch router (LSR) in some embodiments), and receive optical signals from core switching nodes $17_1$-$17_M$ of optical MAN 11. In addition, ingress switching nodes $15_1$-$15_M$ are configured to transmit optical signals to core switching nodes $17_1$-$17_M$ of optical MAN 11. In one embodiment, the ingress switching nodes perform optical-electrical (OE) conversion of received optical signals, and include electronic memory to buffer the received signals until they are sent to the appropriate LAN. In another embodiment, the ingress switching nodes perform electrical-optical (EO) conversion of the received electrical signals before they are transmitted to core switching nodes $17_1$-$17_M$ of optical MAN 11. Embodiments of the ingress switching nodes are described further below.

Egress switching node 18 is implemented with optical switching units or modules that are configured to receive optical signals from other nodes of optical MAN 11 and route them to the optical WAN. Egress switching node 18 can also receive optical signals from the optical WAN and send them to the appropriate node of optical MAN 11. In one embodiment, egress switching node 18 performs OEO conversion of received optical signals, and includes electronic memory to buffer received signals until they are sent to the appropriate node of optical MAN 11 (or to the optical WAN). Embodiments of egress switching node 18 are described further below.

Core switching nodes $17_1$-$17_L$ are implemented with optical switching units or modules that are each configured to receive optical signals from other switching nodes and appropriately route the received optical signals to other switching nodes of optical MAN 11. As is described below, the core switching nodes perform OEO conversion of optical burst labels and network management control label signals. In some embodiments, these optical burst labels and control labels are propagated only on preselected wavelengths. The preselected wavelengths do not propagate optical burst "data" (as opposed to burst labels and control labels) signals in such embodiments, even though the burst and network management control labels may be include necessary information for a particular group of optical burst data signals. In another embodiment, optical burst labels, network management control labels, and optical burst data signals may be propagated on the same wavelength(s) using different encoding schemes such as different modulation formats, etc. In either approach, the optical burst and control labels are sent asynchronously relative to its corresponding optical burst data signals. In still another embodiment, the optical burst labels and control signals are propagated at different transmission rates as the optical data signals.

Although core switching nodes $17_1$-$17_L$ may perform OEO conversion of the optical control signals, in this embodiment, the core switching nodes do not perform OEO conversion of the optical burst data signals. Rather, core switching nodes $17_1$-$17_L$ perform purely optical switching of the optical burst data signals. Thus, the core switching nodes can include electronic circuitry to store and process the incoming optical burst labels and network management control labels that were converted to an electronic form and use this information to configure the photonic burst switch (PBS) settings, and to properly route the optical burst data signals corresponding to the optical burst labels. The new burst labels, which replace the previous burst labels based on the new routing information, are converted to an optical control signal, and it is transmitted to the next core or egress switching nodes. Embodiments of the core switching nodes are described further below.

The elements of exemplary photonic burst switching network 10 are interconnected as follows. LANs $13_1$-$13_N$ are connected to corresponding ones of ingress switching nodes $15_1$-$15_M$ of optical MAN 11.

Within optical MAN 11, ingress switching nodes $15_1$-$15_M$ and egress switching node 18 are connected to some of core switching nodes $17_1$-$17_L$ via optical fibers. Core switching nodes $17_1$-$17_L$ are also interconnected to each other via optical fibers in mesh architecture to form a relatively large number of optical paths or links between the ingress switching nodes, and between ingress switching nodes $15_1$-$15_L$ and egress switching node 18. Ideally, core switching nodes $17_1$-$17_L$ provide more than one optical path between each end point of optical MAN 11 (i.e., the ingress switching nodes and egress switching node 18 are endpoints within optical MAN 11). Multiple optical paths between core switching nodes, ingress nodes, and egress nodes enable protection switching when one or more node fails.

As described below in conjunction with FIG. 2, the ingress, egress and core switching nodes of optical MAN 11 are configured to send and/or receive optical burst labels, optical burst data, and other control signals that are wavelength multiplexed so as to propagate the optical burst labels and control labels on pre-selected wavelength(s) and optical burst data or payloads on different preselected wavelength(s). In addition, optical data payloads can be time division multiplexed (TDM) on a given wavelength. Still further, the endpoints of optical MAN 11 can send optical burst label signals when sending data out of optical MAN 11.

Figure 2:
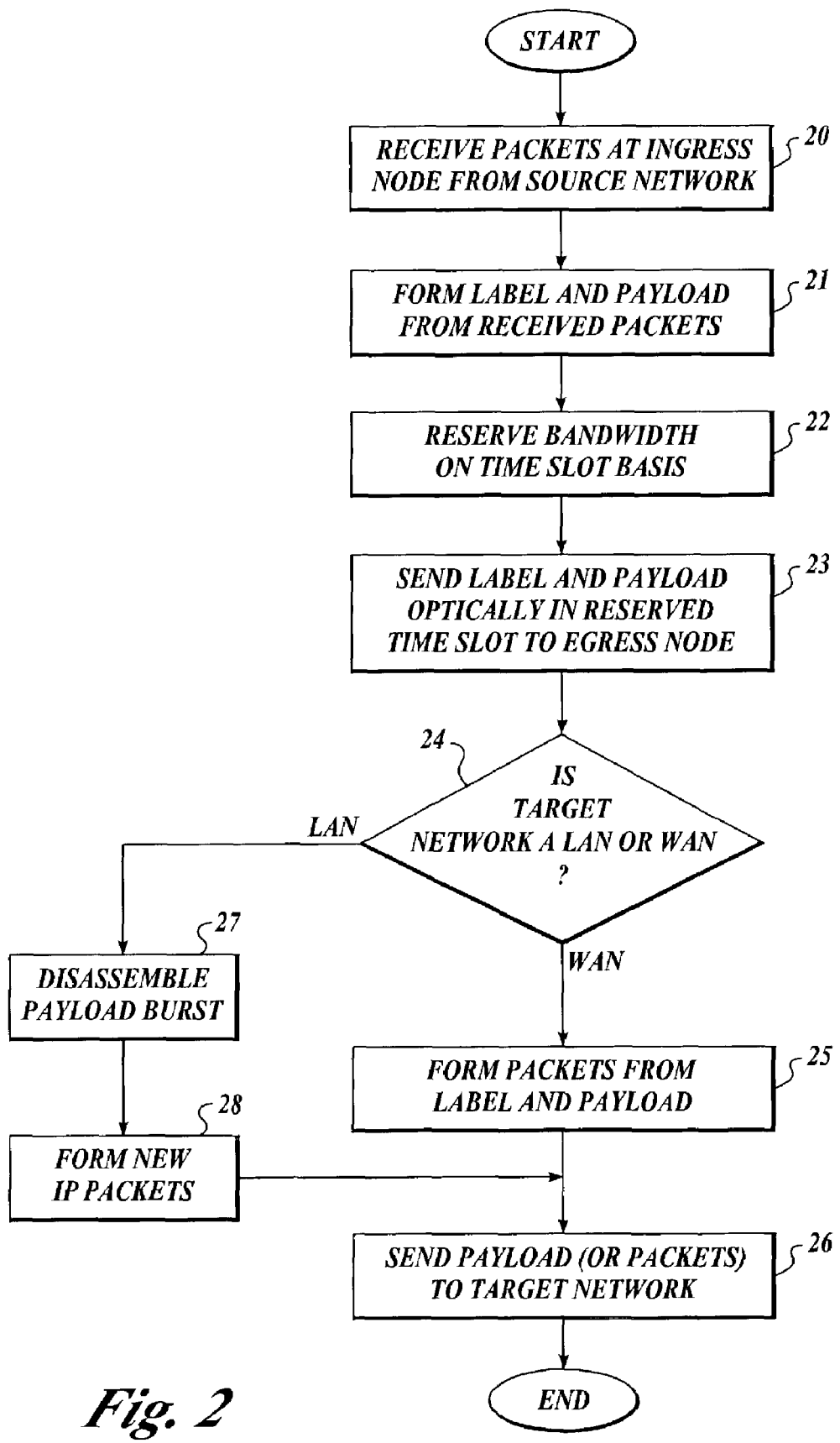
FIG. 2 is a simplified flow diagram illustrating the operation of a photonic burst switching network, according to one embodiment of the present invention.

FIG. 2 illustrates the operational flow of photonic burst switching network 10, according to one embodiment of the present invention. Referring to FIGS. 1 and 2, photonic burst switching network 10 operates as follows.

Optical MAN 11 receives packets from LANs $13_1$-$13_N$. In one embodiment, optical MAN 11 receives IP packets at ingress switching nodes $15_1$-$15_M$. The received packets can be in electronic form rather than in optical form, or received in optical form and then converted to electronic form. In this embodiment, the ingress switching nodes store the received packets electronically. A block 20 represents this operation.

For clarity, the rest of the description of the operational flow of photonic burst switching network 10 focuses on the transport of information from ingress switching node $15_1$ to egress switching node 18. The transport of information from ingress switching nodes $15_2$-$15_M$ is substantially similar.

An optical burst label and payload (i.e., an optical burst data) is formed from the received packets. In one embodiment, ingress switching node $15_1$ uses statistical multiplexing techniques to form the optical burst payload from the received IP (Internet Protocol) packets stored in ingress switching node $15_1$. For example, packets received by ingress switching node $15_1$ and having to pass through egress switching node 18 on their paths to a destination can be assembled into an optical burst data payload. A block 21 represents this operation.

Bandwidth is reserved to transport the optical burst payload through photonic burst switching network 10. In one embodiment, ingress switching node $15_1$ reserves a time slot (i.e., a time slot of a TDM system) in an optical data signal path through photonic burst switching network 10. Further, in one embodiment, the bandwidth is reserved for a time period sufficient to transport the optical burst from the ingress switching node to the egress switching node. For example, in some embodiments, the ingress, core, and egress switching nodes maintain an updated list of all used and available time slots. The time slots can be allocated and distributed over multiple wavelengths and optical fibers. Thus, a reserved time slot (also referred to herein as a TDM channel) may be in one wavelength of one fiber, or can be spread across multiple wavelengths and multiple optical fibers. A block 22 represents this operation.

When an ingress and/or egress switching node reserves bandwidth or when bandwidth is released after an optical burst payload is transported, a network controller (not shown) updates the list. In one embodiment, the network controller and the ingress or egress switching nodes perform this updating process using various burst or packet scheduling algorithms based on the available network resources and traffic patterns. The available time slots, which are periodically broadcasted to all the ingress, core, and egress switching nodes, are transmitted on the same wavelength as the optical burst labels or on a different common preselected wavelength throughout the optical network. The network controller function can reside in one of the ingress switching nodes or can be distributed across two or more ingress switching nodes. In this embodiment, the network controller also resides in the core switching node (e.g., processors 82 or 83 of FIG. 8).

The optical burst labels, network management control labels, and optical burst payloads are then transported through photonic burst switching network 10 in the reserved time slot or TDM channel. In one embodiment, ingress switching node 15$_1$ transmits the burst label to the next switching node along the optical label-switched path (OLSP) determined by the network controller. In this embodiment, the network controller uses a constraint-based routing protocol (e.g., MPLS) over one or more wavelengths to determine the best available OLSP to the egress switching node. In one embodiment, ingress switching node 15$_1$ then asynchronously transmits the optical burst payload to the core switching nodes with little or no time delay. A time delay allows each of the core switching nodes to process the label and configure the photonic burst switches to appropriately switch and forward the payload to the next core switching node without buffering or OEO conversion. The term photonic burst switch is used herein to refer to fast optical switches that do not use OEO conversion. The optical burst label is always sent before the corresponding optical burst payload is transmitted.

In some embodiments, the core switching node may perform OEO conversion of the label so that the node can extract and process the routing information contained in the label. Further, in some embodiments, the TDM channel is propagated in the same wavelengths that are used for propagating labels. Alternatively, the labels and payloads can be modulated on the same wavelength in the same optical fiber using different modulation formats. For example, optical labels can be transmitted using non-return-to-zero (NRZ) modulation format, while optical payloads are transmitted using return-to-zero (RZ) modulation format. The optical burst is transmitted from one core switching node to another core switching node in a similar optical MAN until the optical burst is terminated at egress switching node 18. A block 23 represents this operation.

The operational flow at this point depends on whether the target network is an optical WAN or a LAN. A block 24 represents this branch in the operational flow.

If the target network is an optical WAN, new optical label and payload signals are formed. In this embodiment, egress switching node 18 prepares the new optical label and payload signals. A block 25 represents this operation.

The new optical label and payload are then transmitted to the target network (i.e., WAN in this case). In this embodiment, egress switching node 18 includes an optical interface to transmit the optical label and payload to the optical WAN. A block 26 represents this operation.

However, if in block 24 the target network is a LAN, the optical burst payload is disassembled to extract the IP packets. In this embodiment, egress switching node 18 converts the optical burst payload to electronic signals that egress switching node 18 can process to recover the data segment of each of the packets. A block 27 represents this operation.

The extracted IP data packets are processed, combined with the corresponding IP labels, and then routed to the target network (i.e., LAN in this case). In this embodiment, egress switching node 18 forms these new IP packets. A block 28 represents this operation. The new IP packets are then transmitted to the target network (i.e., LAN) as shown in block 26.

Photonic burst switching network 10 can achieve increased bandwidth efficiency through the additional flexibility afforded by the TDM channels. Although this exemplary embodiment described above includes an optical MAN having ingress, core and egress switching nodes to couple multiple LANs to an optical WAN backbone, in other embodiments the networks do not have to be LANs, optical MANs or WAN backbones. That is, optical MAN 11 need not service a "metropolitan area". Rather, photonic burst switching network 10 may include a number of relatively small networks that are coupled to a relatively larger network that in turn is coupled to a backbone network.

Figure 3:
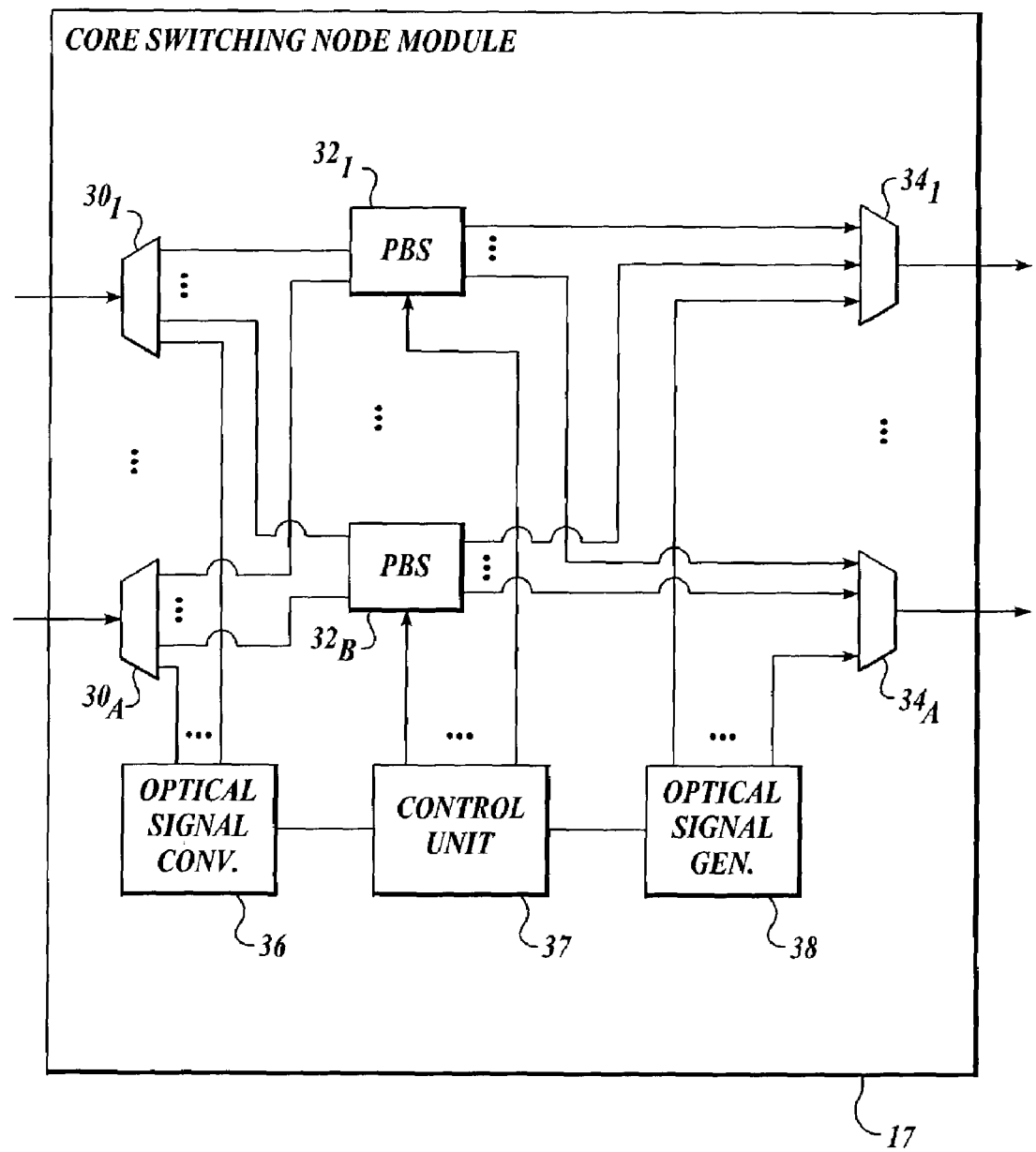
FIG. 3 is a block diagram illustrating a core switching node module for use in a photonic burst switching network, according to one embodiment of the present invention.

FIG. 3 illustrates a module 17 for use as a core switching node in photonic burst switching network 10 (FIG. 1), according to one embodiment of the present invention. In this embodiment, module 17 includes a set of optical wavelength division demultiplexers 30$_1$-30$_A$, where A represents the number of input optical fibers used for propagating payloads, labels, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N photonic burst switches 32$_1$-32$_B$, where N is the number of input/output ports of each photonic burst switch. Thus, in this embodiment, the maximum number of wavelengths at each photonic burst switch is A·C, where N≧A·C+1. For embodiments in which N is greater than A·C, the extra input/output ports can be used to loop back an optical signal for buffering.

Further, although photonic burst switches 32$_1$-32$_B$ are shown as separate units, they can be implemented as N×N photonic burst switches using any suitable switch architecture. Module 17 also includes a set of optical wavelength division multiplexers 34$_1$-34$_A$, a set of optical-to-electrical signal converters 36 (e.g., photo-detectors), a control interface unit 37, and a set of electrical-to-optical signal converters 38 (e.g., lasers).

Figure 10:
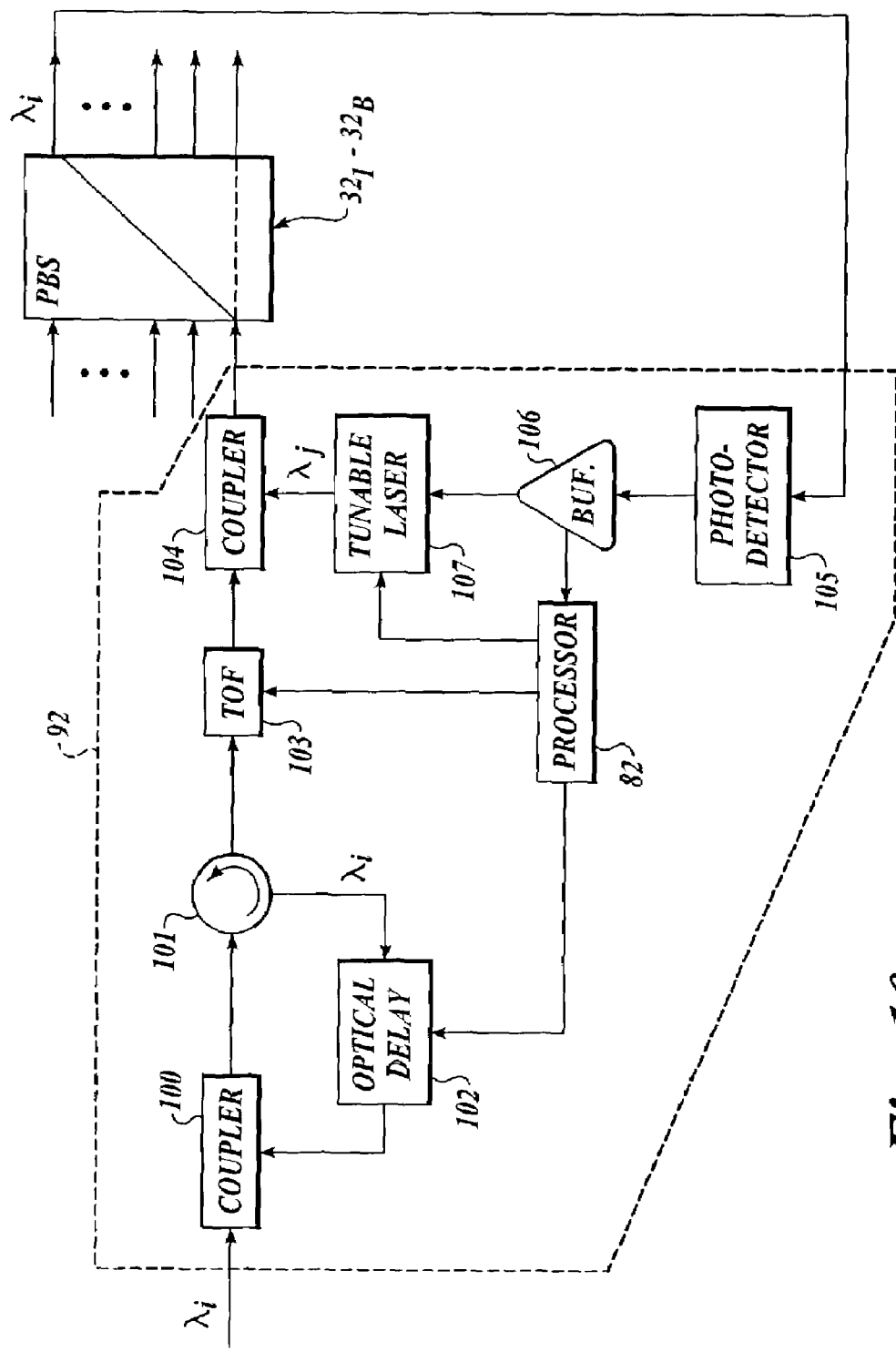
FIG. 10 is a block diagram illustrating a portion of the core switching node module with an optical buffer of FIG. 9, according to one embodiment of the present invention.

The elements of this embodiment of module 17 are interconnected as follows. Optical demultiplexers 30$_1$-30$_A$ are connected to a set of A input optical fibers that propagate input optical signals from other switching nodes of photonic burst switching network 10 (FIG. 10). The output leads of the optical demultiplexers are connected to the set of B core optical switches $32_1$-$32_B$ and to optical signal converter 36. For example, optical demultiplexer 30, has B output leads connected to input leads of the photonic burst switches $32_1$-$32_B$ (i.e., one output lead of optical demultiplexer $30_1$ to one input lead of each photonic burst switch) and at least one output lead connected to optical signal converter 36.

The output leads of photonic burst switches $32_1$-$32_B$ are connected to optical multiplexers $34_1$-$34_A$. For example, photonic burst switch $32_1$ has A output leads connected to input leads of optical multiplexers $34_1$-$34_A$ (i.e., one output lead of photonic burst switch $32_1$ to one input lead of each optical multiplexer). Each optical multiplexer also an input lead connected to an output lead of electrical-to-optical signal converter 38. Control unit 37 has an input lead or port connected to the output lead or port of optical-to-electrical signal converter 36. The output leads of control unit 37 are connected to the control leads of photonic burst switches $32_1$-$32_B$ and electrical-to-optical signal converter 38. As described below in conjunction with the flow diagram of FIG. 5, module 17 is used to receive and transmit optical burst labels, optical burst payloads, and network management control labels. In one embodiment, the optical burst payload and optical burst labels have transmission formats as shown in FIGS. 4A and 4B.

Figure 4A:
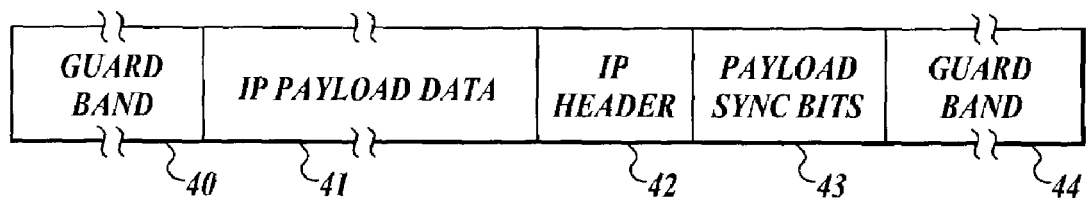
FIGS. 4A and 4B are diagram illustrating the format of an optical burst payload and an optical burst label for use in a photonic burst-switched network, according to one embodiment of the present invention.

FIG. 4A illustrates the format of an optical burst payload for use in photonic burst switching network 10 (FIG. 1), according to one embodiment of the present invention. In this embodiment, each optical burst payload has a start guard band 40, an IP payload data segment 41, an IP header segment 42, a payload sync segment 43 (typically a small number of bits), and an end guard band 44 as shown in FIG. 4A. IP payload data segment 41 includes the statistically-multiplexed IP data packets used to form the burst. Although FIG. 4A shows the payload as contiguous, module 17 transmits payloads in a TDM format. Further, in some embodiments the burst payload can be segmented over multiple TDM channels. It should be pointed out that in this embodiment, the optical burst payloads and optical burst labels have local significance only at the optical MAN, and may loose their significance at the optical WAN.

Figure 4B:
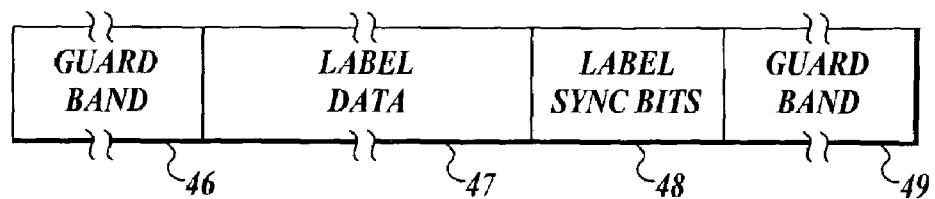

FIG. 4B illustrates the format of an optical burst label for use in photonic burst switching network 10 (FIG. 1), according to one embodiment of the present invention. In this embodiment, each optical label has a start guard band 46, an IP label data segment 47, a label sync segment 48 (typically a small number of bits), and an end guard band 49 as shown in FIG. 4B. In this embodiment, label data segment 45 contains all the necessary routing and timing information of the IP packets to form the optical burst. Although FIG. 4B shows the payload as contiguous, in this embodiment module 17 transmits labels in a TDM format.

In some embodiments, an optical network management control label (not shown) is also used in photonic burst switching network 10 (FIG. 1). In such embodiments, each optical network management control label includes: a start guard band similar to start guard band 46; a network management data segment similar to data segment 47; a network management sync segment (typically a small number of bits) similar to label sync segment 48; and an end guard band similar to end guard band 44. In this embodiment, network management data segment contains network management information needed to coordinate transmissions over the network. In some embodiments, the optical network management control label is transmitted in a TDM format.

Figure 5:
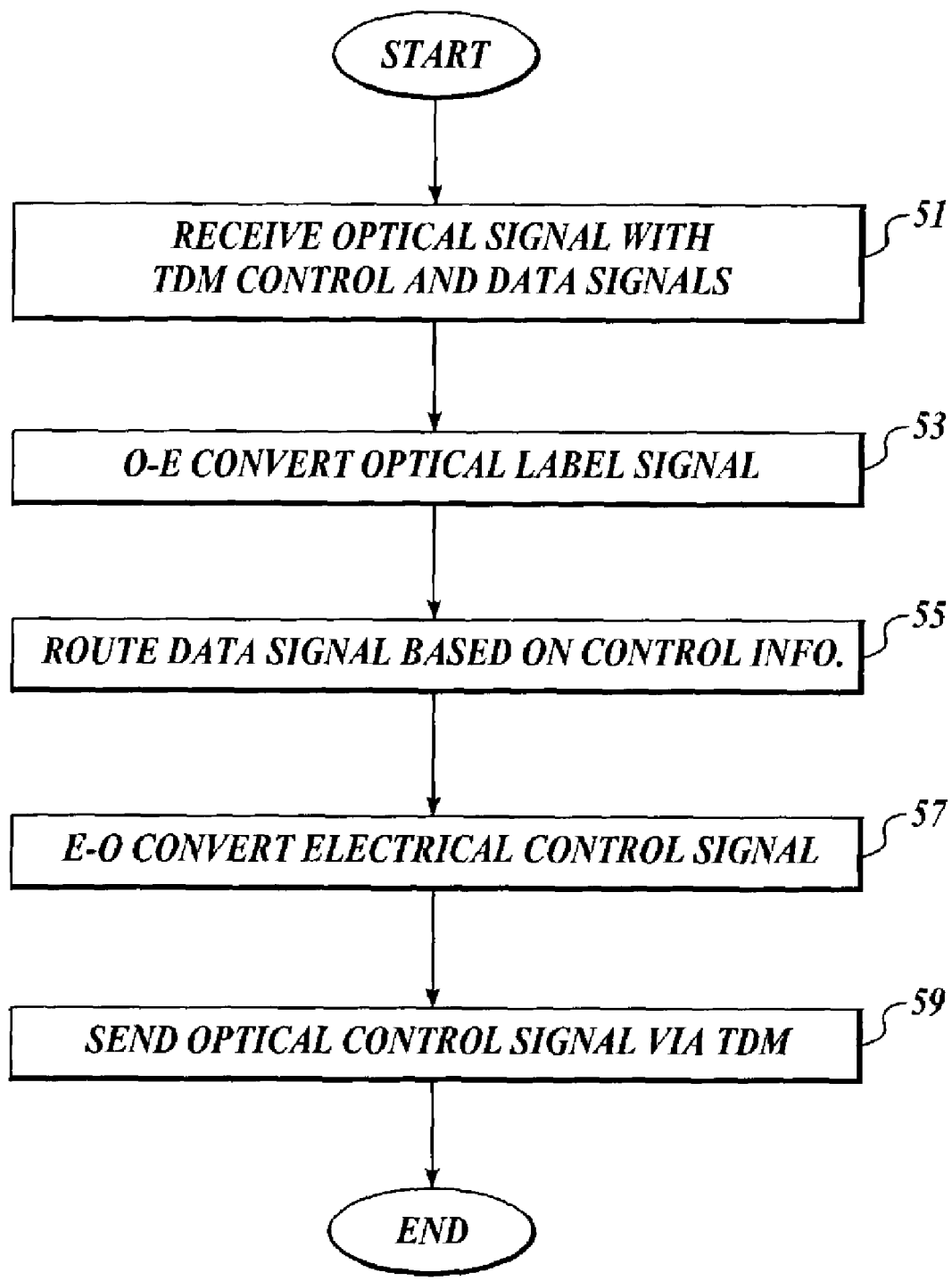
FIG. 5 is a flow diagram illustrating the operation of a core switching node module, according to one embodiment of the present invention.

FIG. 5 illustrates the operational flow of module 17 (FIG. 3), according to one embodiment of the present invention. Referring to FIGS. 3 and 5, module 17 operates as follows.

Module 17 receives an optical signal with TDM label and data signals. In this embodiment, module 17 receives an optical label signal (e.g., optical burst label) and an optical burst data signal (i.e., optical burst payload signal in this embodiment) at one or two of the optical demultiplexers. For example, the optical label signal may be modulated on a first wavelength of an optical signal received by optical demultiplexer $30_A$, while the optical burst payload signal is modulated on a second wavelength of the optical signal received by optical demultiplexer $30_A$. In some embodiments, the optical label signal may be received by a first optical demultiplexer while the optical burst payload signal is received by a second optical demultiplexer. Further, in some cases, only an optical label signal (e.g., a network management control label) is received. A block 51 represents this operation.

Module 17 converts the optical label signal into an electrical signal. In this embodiment, the label signal is the optical burst label signal, which is separated from the received optical signal by the optical demultiplexer and sent to optical-to-electrical signal converter 36. In other embodiments, the optical label signal can be a network management label (previously described in conjunction with FIG. 4B). Optical-to-electrical signal converter 36 converts the optical label signal into an electrical signal. For example, in one embodiment each portion of the TDM label signal is converted to an electrical signal. The electrical labels received by the control unit 37 are processed to form a new label. In this embodiment, control unit 37 stores and processes the labels. A block 53 represents this operation.

Module 17 then routes the optical burst data signals (i.e., optical burst payload signals in this embodiment) to one of optical multiplexers $34_1$-$34_A$, based on routing information contained in the label. In this embodiment, control unit 37 processes the label to extract the routing and timing information and sends appropriate PBS configuration signals to the set of B photonic burst switches $32_1$-$32_B$ to re-configure each of the core switches to switch the corresponding payload signals. A block 55 represents this operation.

Module 17 then converts the processed electrical label signal to a new optical label signal. In this embodiment, control unit 37 provides time slots alignment so that reconverted or new optical labels are generated in the desired wavelength and TDM time slot pattern. The new label may be modulated on a wavelength and/or time slot that are different from the wavelength and time slot of the label signal received in block 51. A block 57 represents this operation.

Module 17 then sends the optical signal to the next switching node in the route. In this embodiment, electrical-to-optical signal generator 38 sends the new optical label signal to appropriate optical multiplexer of optical multiplexers $34_1$-$34_A$ to achieve the route. A block 59 represents this operation.

Figure 6:
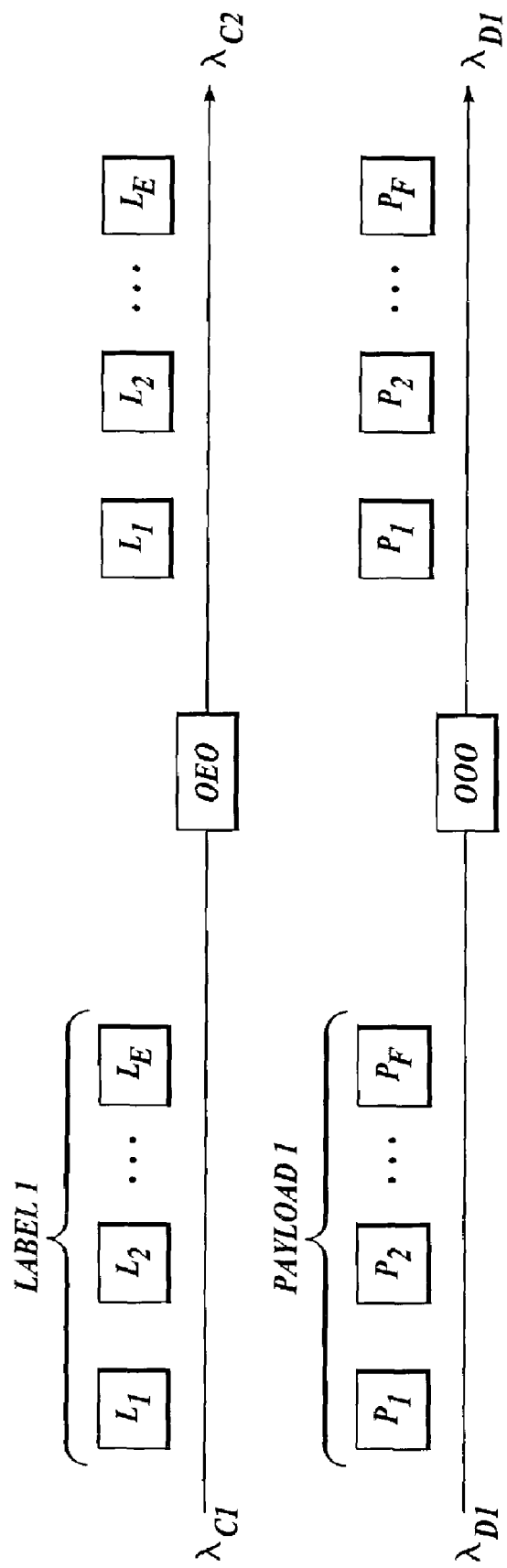
FIG. 6 is a diagram illustrating time slot provisioning, according to one embodiment of the present invention.

FIG. 6 illustrates time slot or TDM channel provisioning, according to one embodiment of the present invention. In this example, a label signal is propagated on a control wavelength $\lambda_{C1}$ while the corresponding optical payload signal is propagated on a data wavelength $\lambda_{D1}$ via an output optical fiber(s) selected according to the routing information contained in the optical label signal. In some embodiments, the optical label signal is transmitted before the payload signal with sufficient lead time to allow all the nodes along the optical path to process the label signal before it receives the payload signal. In this way, the modules can configure their photonic burst switches to transport the payload signal with minimal delay. As shown in FIG. 6, in this example the label signal is TDM transmitted in E portions on control wavelength $\lambda_{C1}$. Although not shown, other optical label signals can be TDM transmitted in different time slots of wavelength $\lambda_{C1}$. The optical burst payload signal in this example is TDM transmitted in F portions on data wavelength $\lambda_{D1}$.

When received by a module (e.g., module 17 of FIG. 3), the optical label signal undergoes OE conversion so that the label signal can be processed to extract control label information (e.g., routing and timing information). The processed label signal undergoes EO conversion, and then transmitted out of the module via an output optical fiber(s) selected by the routing information extracted from the received label signal. In this embodiment, the optical label signal can be transmitted on a different control wavelength (e.g., wavelength $\lambda_{C2}$) as shown in the FIG. 6 example. In other instances, the module can transmit the new label signal on the same control wavelength that the module received the label signal.

The optical payload signal, when received by the module, is not OEO converted. Rather, the photonic burst switch module switches the optical payload signal within the appropriate TDM channel, and route the payload signal to the next switching node based on the new routing information contained in the new label. The TDM channel is on the same data wavelength (wavelength $\lambda_{D1}$) as shown in the FIG. 6 example, but the wavelength is propagated by the optical fiber selected by the photonic burst switches of the module. In some embodiments, the photonic burst switch module may change the available time slot using fiber delay lines.

Figure 7:
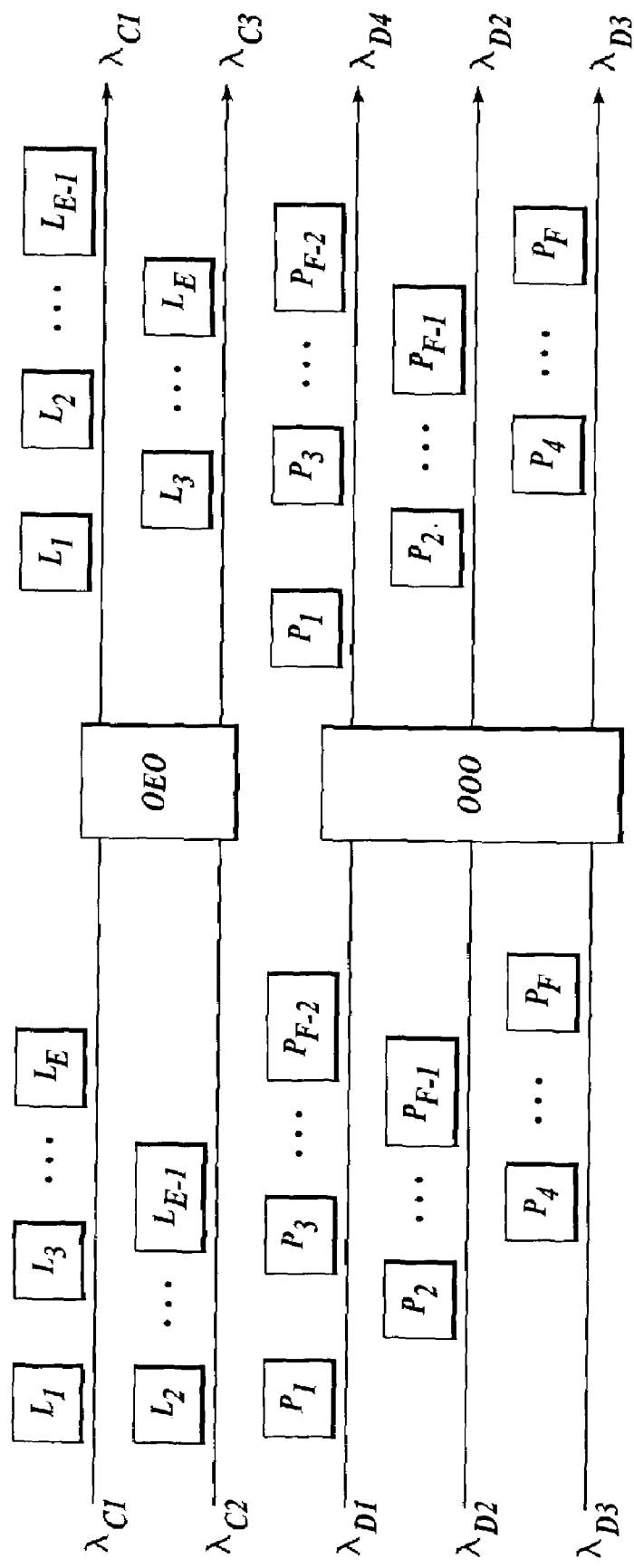
FIG. 7 is a diagram illustrating multi-wavelength time slot provisioning, according to one embodiment of the present invention.

FIG. 7 illustrates multi-wavelength time slot or TDM channel provisioning, according to one embodiment of the present invention. In this example, the label signal is TDM propagated on control wavelengths $\lambda_{C1}$ and $\lambda_{C2}$. After OE conversion, the new label signal can be TDM transmitted on different wavelengths and/or time slots. As shown in FIG. 7, some TDM portions of the label signal are propagated in time slots on wavelength $\lambda_{C1}$ while others are propagated in time slots on wavelength $\lambda_{C3}$. In other embodiments, different control wavelengths can be used.

Similarly, the TDM portions of the payload signal are distributed over multiple wavelengths. In this example, the TDM portions of the optical payload signal are optically switched to the selected output optical fibers on the same wavelengths and time slots as received. However, in other embodiments, the TDM portions of the optical payload signal can be transmitted in different timeslots.

Figure 8:
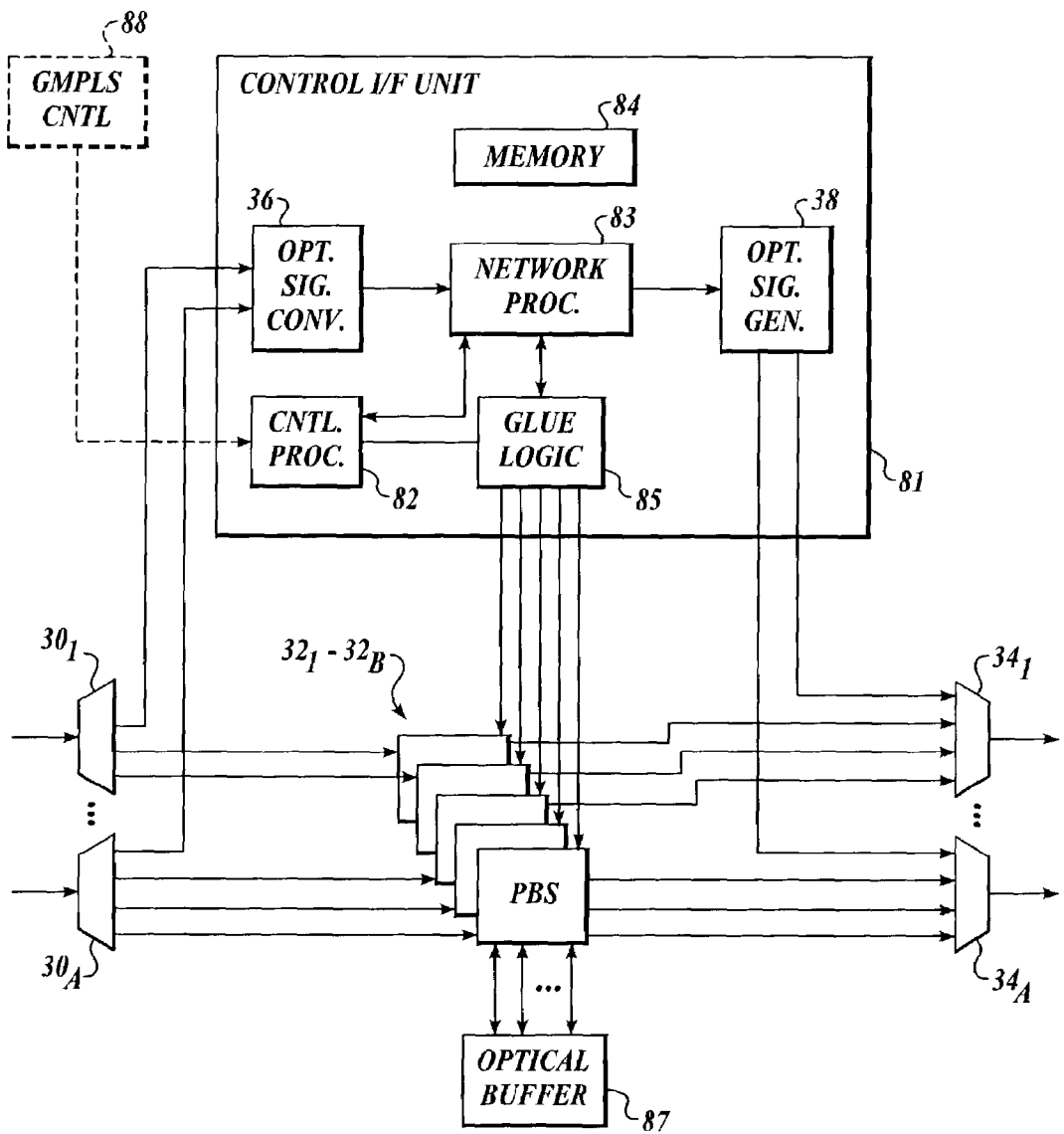
FIG. 8 is a block diagram illustrating a core switching node module that supports generalized multi-protocol label switching (GMPLS), according to one embodiment of the present invention.

FIG. 8 illustrates module 17 that implements a core switching node of photonic burst switching network 10 (FIG. 1) that supports generalized multi-protocol label switching (GMPLS), according to one embodiment of the present invention. This embodiment is similar to the embodiment of FIG. 3, except that control unit 37 is contained in a control interface unit 81 that also contains the set of optical-to-electrical signal converters 36 and the set of electrical-to-optical signal generators 38. In addition, control unit 37 is implemented with a control processor 82, a network processor 83, memory 84 and glue logic 85. This embodiment of module 17 also includes an optical buffer 87 implemented with precision fiber delay lines.

In this embodiment, photonic burst switches $32_1$-$32_B$ are implemented using the fast polysilicon trench waveguide technology disclosed in two co-pending and commonly assigned U.S. patent applications both entitled "Method and Apparatus For Steering An Optical Beam In A Semiconductor Substrate", Ser. No. 09/811,171 filed Mar. 16, 2001 by Ansheng Liu et al., and Ser. No. 09/819,160 filed Mar. 27, 2001 by Ansheng Liu et al. In other embodiments, different technologies can be used to implement the photonic burst switches. Photonic burst switches $32_1$-$32_B$ provide N×N switching under the control of control interface unit 81.

This embodiment of module 17 operates in substantially the same way as described above in conjunction with FIGS. 3 and 5. More particularly to this embodiment, control processor 82 can receive GMPLS information from a network controller 88 (shown in dashed lines). In such an embodiment, the network controller can be a hardware processing unit such as control processor 82, and/or a software module residing at either control processor 82 or in the network processor 83. In this embodiment, network controller 88 is configured to provide a unified control plane signaling using known GMPLS protocols. In this way, network controller 88 can maintain the list of available TDM channels and determine an efficient route to transport an optical burst. In another embodiment, the network controller can reside as a software module in network processor 83.

Network processor 83 can perform label swapping, TDM control, burst labels' assembly/disassembly, and other necessary functions. In some embodiments, the burst labels can be nested inside other burst labels, giving rise to hierarchy of burst labels. Network processor 83 can provide timing and control signals to glue logic 85 to control the timing and switch configuration settings of the photonic burst switches to process the routing information extracted from received label signals. Network processor 83 can also control the photonic burst switches to route signals to optical buffer 87 when a desired TDM channel is not available (e.g., due to contention). In accordance of the teachings of embodiments of this invention for photonic burst switching network 10 (FIG. 1), the size of optical buffer 87 (e.g., the length of the optical fiber delay lines) can be significantly smaller than what would be required to implement for a conventional optical burst or packet switching network.

Similarly, this embodiment of module 17 can be modified to implement an ingress module by adding an electronic input interface to receive and store IP packets from the access networks and circuitry for electrical-to-optical conversion of the stored packet header and data segments that are combined to form an optical burst.

Figure 9:
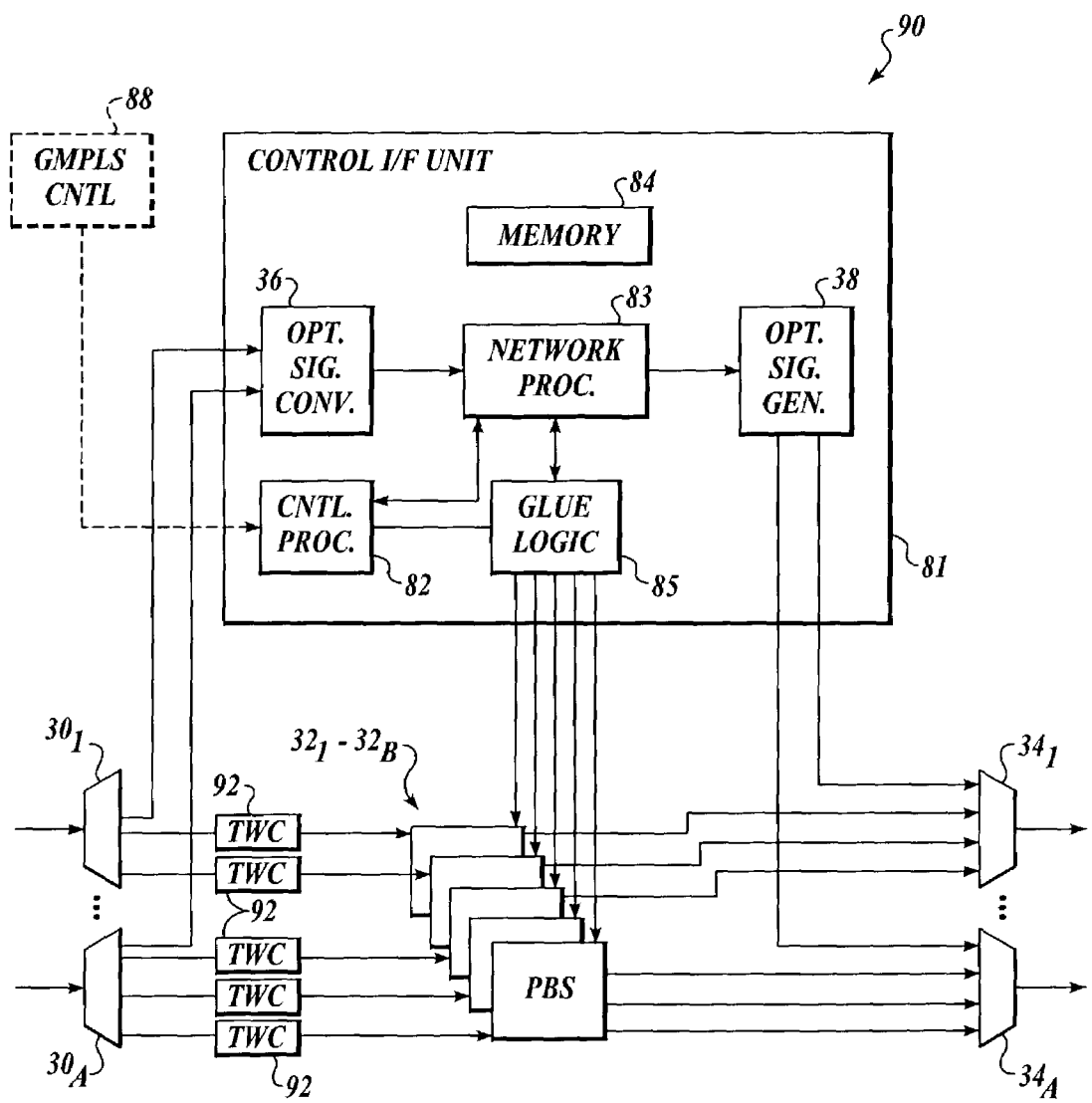
FIG. 9 is a block diagram illustrating a core switching node module with tunable wavelength conversion, according to one embodiment of the present invention.

FIG. 9 illustrates a core switching node module 90 with tunable wavelength converters, according to one embodiment of the present invention. This embodiment of module 90 is similar to the embodiment of module 17 (FIG. 8) except that module 90 does not have optical buffer 87, but does include tunable wavelength converters (TWCs) 92 connected between photonic burst switches $32_1$-$32_B$ and demultiplexers $30_1$-$30_A$. In addition, photonic burst switches $32_1$-$32_B$ provide at least one spare output port. As previously described, photonic burst switches $32_1$-$32_B$ provide N×N switching under the control of control interface unit 81.

In this embodiment, each of demultiplexers $30_1$-$30_A$ has each of its "optical payload" output leads connected to an input lead of a corresponding TWC 92. The output leads of the TWCs 92 are connected to photonic burst switches $32_1$-$32_B$. Thus, demultiplexers $30_1$-$30_A$ in this embodiment of module 90 are connected to photonic burst switches $32_1$-$32_B$ in the same manner as in module 17 (FIG. 8) except that in module 90 each of these connections is through a TWC. In addition, although not shown in FIG. 9 to avoid obscuring the drawing, each of TWCs 92 has a control port connected to control interface unit 81.

In basic operation, one embodiment of module 90 operates as follows. When there is no contention, module 90 operates as described above for module 17 (FIG. 8). However, when a TDM channel is not available for a payload signal arriving at one of the input ports of module 90, control interface unit 81 will detect this condition.

In response, when bursts of the incoming optical payload signal have not arrived yet at the. photonic burst switches of module 90, control interface unit 81 changes the photonic burst switches $32_1$-$32_B$ configurations to switch the incoming optical payload signal to one of the spare output ports of photonic burst switches $32_1$-$32_B$. In addition, control interface unit 81 causes TWC 92 that receives this delayed optical payload signal to convert its wavelength to another available wavelength. Photonic burst switches $32_1$-$32_B$ are able to switch the "converted" optical payload signal within an available TDM channel, thereby bypassing the "blocked" TDM channel. In one embodiment, the output converted payload signal can be converted back to the original wavelength at the next switching node when another TDM channel becomes available. In another embodiment, another TWC (not shown) at the output ports of the photonic burst switches $32_1$-$32_B$ can be used at the same switching node to convert the converted payload signal back to the original wavelength.

However, in this embodiment module 90, if bursts of the incoming optical payload signal have already arrived at the photonic burst switches when the contention condition is detected, these packets are dropped. In addition, in this embodiment, control interface unit 81 sends a network management message to the sending node to resend the dropped packets.

FIG. 10 illustrates a TWC 92 in a portion of module 90 (FIG. 9), according to one embodiment of the present invention. In this embodiment, this TWC 92 includes an optical coupler 100, a circulator 101, an optical delay 102, a tunable optical filter (TOF) 103, another optical coupler 104, a photo-detector 105, an electronic buffer 106, a tunable laser 107 and a control processor 82.

In one embodiment, optical delay 102 is a fixed time-delay optical delay circuit. For example, optical delay 102 can be a Fabry-Perot etalon in a fixed delay embodiment. In other embodiments, optical delay 102 can be a variable time-delay optical circuit implemented with a set of different length optical fibers sandwiched between a fiber combiner and splitter.

Also, in this embodiment, TOF 103 is a tunable optical filter that is configured to either pass or reflect an optical signal of a selected wavelength in response to a control signal. In this embodiment, TOF 103 has a center wavelength (i.e., the wavelength that is reflected by the optical filter) that can be tuned. Thus, in the "pass" mode, TOF 103 would be tuned on a wavelength displaced from wavelength to be passed. In the "reflect" mode, TOF 103 would be tuned on the wavelength to be reflected. In other embodiments, TOF 103 may be implemented using other suitable circuits.

The elements of the TWC 92 shown in FIG. 10 are interconnected as follows. Coupler 100 has three ports: a first port connected to an output port of a demultiplexer (i.e., one of demultiplexers $30_1$-$30_4$ shown in FIG. 9); a second port connected to a port of circulator 101; and a third port connected to an output port of optical delay 102. Circulator 101 has three ports: one connected to an input port of optical delay 102, a second port connected to an input port of TOF 103, and a third port connected to coupler 100. More specifically, coupler 100 and circulator 101 are connected to pass a payload signal of wavelength $\lambda_i$ from the optical demultiplexer to TOF 103.

TOF 103 has an output port connected to a port of coupler 104. Coupler 104 has two other ports: one connected to an input port of photonic burst switches $32_1$-$32_B$, and another connected to receive an optical signal from tunable laser 107. Tunable laser 107 has a digital input port connected to an output port of buffer 106, which in turn has an input port connected to an output port of photo-detector 105. Photo-detector 105 is connected to receive an optical signal from one of the "spare" output ports of photonic burst switches $32_1$-$32_B$. Control processor 82 is connected to optical delay 102, TOF 103, buffer 106 and tunable laser 107 so that control processor 82 can control or monitor the operation of these elements. The operation of this portion of module 90 is described below in conjunction with FIG. 11.

Figure 11:
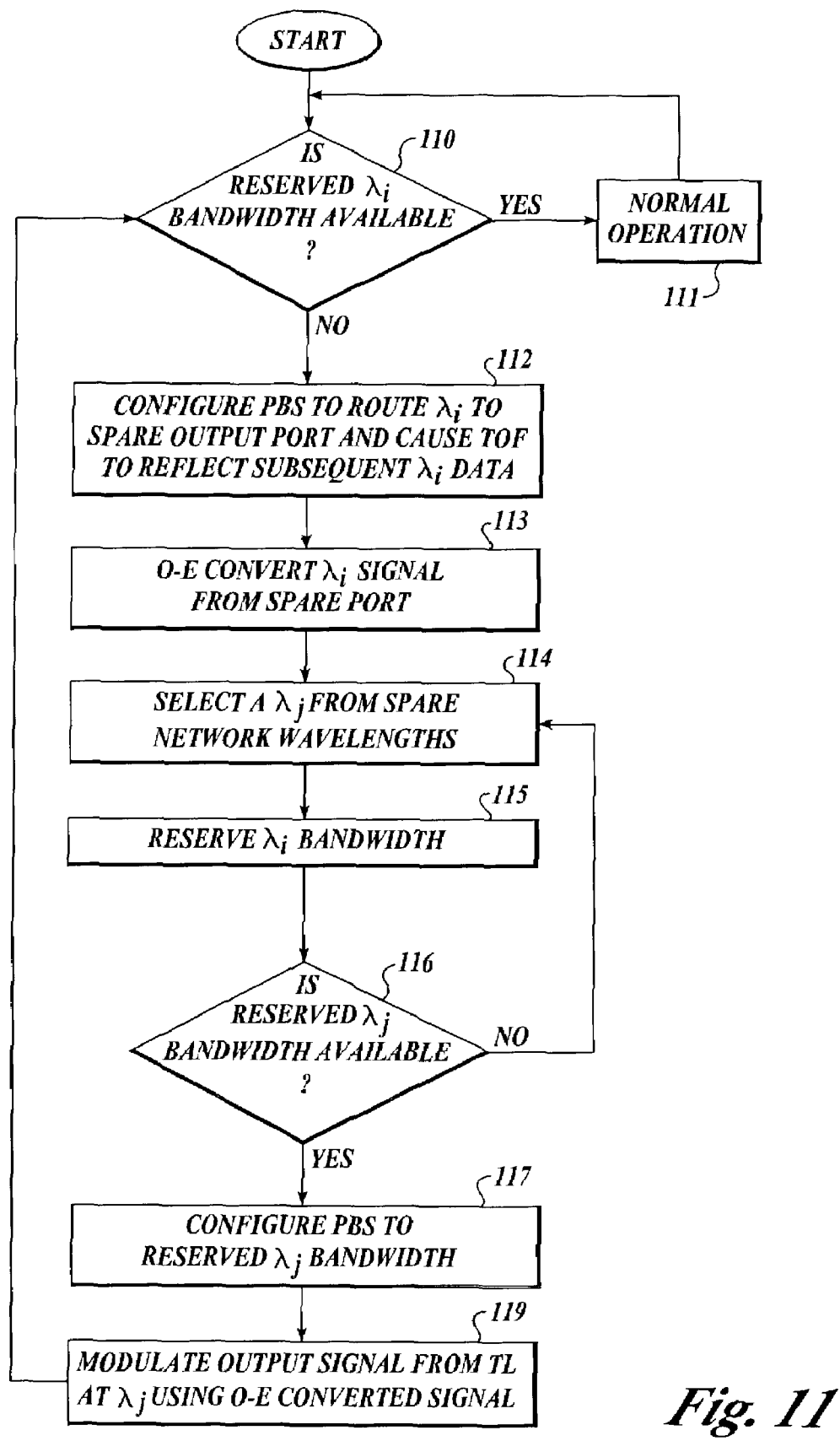
FIG. 11 is a flow diagram illustrating the operation of the core switching node module of FIG. 10, according to one embodiment of the present invention.

FIG. 11 illustrates the operational flow of a portion of module 90 (FIG. 10) having a TWC, according to one embodiment of the present invention. Although the operation with respect to only one TWC is described, the operation of module 90 with respect to the other TWCs is substantially similar. Referring to FIGS. 10 and 11, this embodiment of module 90 operates as follows.

During operation, module 90 monitors the availability of reserved bandwidth (e.g., a TDM channel) for wavelength $\lambda_i$. In one embodiment, network processor 83 (FIG. 9) monitors the availability of reserved bandwidth and passes this information to control processor 82. For example, if a received label contains information reserving a particular TDM channel, network processor 83 (FIG. 9) would then determine whether photonic burst switches $32_1$-$32_B$ are available to be configured to provide the reserved TDM channel. In other embodiments, control processor 82 performs this operation directly. For example, control processor 82 may be implemented by network processor 83 (FIG. 9). A block 110 represents this operation.

If the reserved TDM channel is available, module 90 operates as described above for module 17 (FIG. 8) to switch the payload signal to the reserved TDM channel. More specifically, the TWC 92 allows the incoming payload signal (i.e., at wavelength N) to pass through to photonic burst switches $32_1$-$32_B$. Thus, in this embodiment, the payload signal passes through coupler 100 and circulator 101 to TOF 103, which is configured to pass the payload signal to the photonic burst switches so that the payload signal can be switched to the reserved TDM channel. A block 111 represents this operation.

However, if the TDM channel is not available in block 110, and no packets of the incoming optical payload signal have arrived yet at the photonic burst switches of module 90, photonic burst switches $32_1$-$32_B$ are configured to switch the incoming optical payload signal to one of the spare output ports of photonic burst switches $32_1$-$32_B$. In addition, TOF 103 is configured to reflect the incoming payload signal back to circulator 101. In this embodiment, control processor 82 configures the photonic burst switches and TOF 103.

As a result, a portion of the optical payload signal (within a specific TDM channel) is routed to the spare output port. Further, subsequent portions of the incoming payload signal are re-circulated by circulator 101 and optical delay 102. After delaying these portions of the incoming payload signal, optical delay 102 directs the delayed portions to coupler 100, which then directs the delayed portions back to circulator 101. The delayed portions are then continually recirculated via circulator 101, optical delay 102 and coupler 100 until TOF 103 is tuned to pass ) $\lambda_1$ wavelength signals. A block 112 represents this operation.

However, as previously described, in some embodiments, if one or more packets of the incoming optical payload signal have already arrived at the photonic burst switches of module 90, the module drops these packets and sends a message to the sending node to resend the dropped packets.

The portion of the payload signal routed to the spare output port is then converted to an electrical signal. In one embodiment, photo-detector 105 receives this portion of the optical payload signal and converts it to an electrical signal. The corresponding electrical signal is buffered by buffer 106, and then used to directly modulate tunable laser 107. A block 113 represents this operation.

A wavelength is then selected from spare network wavelengths. In this embodiment, spare wavelengths are set aside for use by any node in the network for special uses such as buffering and are not normally used for optical burst payloads and labels. In this embodiment, control processor 82 selects a spare wavelength (indicated as wavelength $\lambda_j$) from the available spare wavelengths (which have wavelengths different from the wavelength of the payload signal). A block 114 represents this operation.

Bandwidth for the selected spare wavelength is reserved. In this embodiment, control processor 82 reserves the bandwidth (e.g., a TDM channel) by sending an optical network management control label signal to other nodes in the network. When control processor 82 does not have enough time to select the spare wavelength and reserve the bandwidth before the optical payload signal arrives, the packets are dropped (as previously described). In addition, in this embodiment, control interface unit 81 sends a network management message to the sending node to resend the dropped packets. A block 115 represents this operation.

Module 90 monitors the availability of reserved bandwidth (e.g., a TDM channel) for the spare wavelength $\lambda_j$ in a similar manner to the operation described for block 110. A block 116 represents this operation.

The photonic burst switches are then configured to switch the spare wavelength signal to the reserved bandwidth. In this embodiment, control processor 82 configures photonic burst switches $32_1$-$32_B$ to switch the spare wavelength $\lambda_j$ to the reserved bandwidth (i.e., TDM channel). A block 117 represents this operation.

An optical signal of a wavelength $\lambda_j$ is then modulated to contain information from the electrical signal generated by photo-detector 105. In one embodiment, tunable laser 107 receives the electrical signal generated by photo-detector 105 via buffer 106, which the tunable laser then uses (as described above) to modulate an output optical signal having a wavelength $\lambda_j$. Coupler 104 receives and directs this signal back to photonic burst switches $32_1$-$32_B$. As previously described in conjunction with FIG. 9, the photonic burst switches are configured to route this new wavelength signal within an available TDM channel, thereby avoiding a contention problem. In such embodiments, the network has one or more spare wavelengths that can be used throughout the network. A block 119 represents this operation. After transmission of the $\lambda_j$ data, the operational flow returns to block 110.

This embodiment has several advantages. For example, the use of TWC 92 provides an additional degree of freedom in avoiding possible traffic contention problems. In addition, the portions of the $\lambda_i$ wavelength payload signal that are received after the photonic burst switches are configured to route $\lambda_j$ wavelength signals are diverted to an optical delay and, thus, are not lost.

Figure 12:
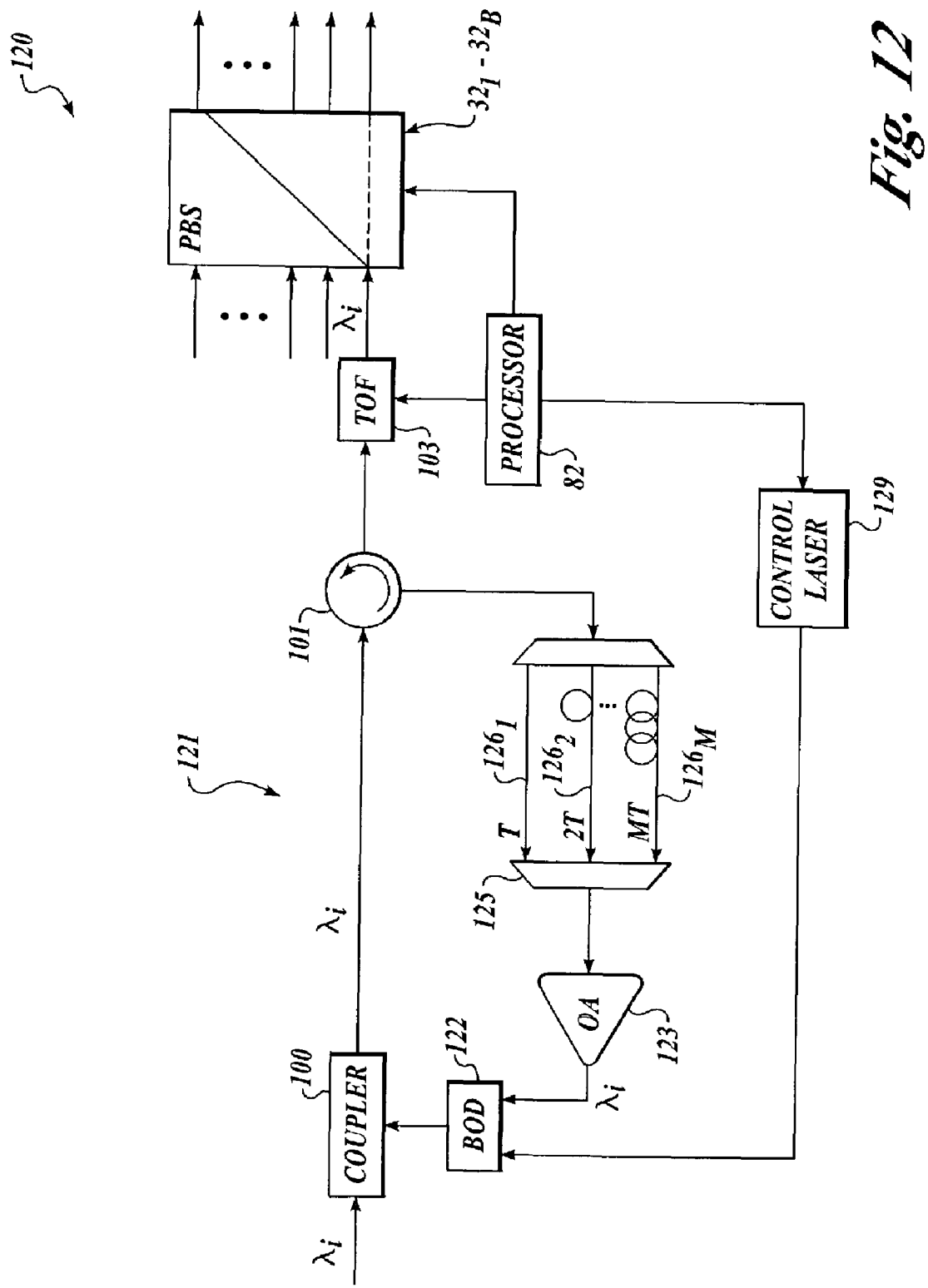
FIG. 12 is a block diagram illustrating a core switching node module with a variable delay optical buffer, according to one embodiment of the present invention.

FIG. 12 illustrates a portion of a core switching node module 120 with a variable time-delay optical buffer, according to one embodiment of the present invention. In this embodiment, module 120 is substantially similar to module 90 (FIGS. 9 and 10) except that module 120 includes a variable time-delay optical buffer (VDOB) 121 instead of a TWC. In addition, other input ports of photonic burst switches $32_1$-$32_B$ have VDOBs (not shown) that are substantially similar to VDOB 121. In one embodiment, VDOB 121 includes coupler 100, circulator 101, TOF 103 and control processor 82 as in TWC 92 (FIG. 10). In addition, VDOB 121 includes a bistable optical device (BOD) 122, an optical amplifier 123, an optical combiner 125, optical delay lines $126_1$-$126_M$, an optical splitter 128, and a laser 129.

In this embodiment, BOD 122 is a gating device that outputs an optical signal only when the intensity of its input signal(s) exceeds a threshold intensity level. Such devices are known in the relevant art. For example, an InGaAsP/InP multiple quantum well (MQW) material sandwiched in a Fabry-Perot etalon can operate with nanosecond switch on and off times at room temperature and a relatively low input power.

The elements of this embodiment of VDOB 121 are interconnected as follows. Coupler 100 has three ports: a first port connected to an output port of a demultiplexer (e.g., such as one of demultiplexers $30_1$-$30_A$ shown in FIG. 9); a second port connected to an output port of BOD 122; and a third port connected to a port of circulator 101. Circulator 101 has two other ports: one connected to an input port of optical splitter 128 and another connected to an input port of TOF 103. More specifically, coupler 100 and circulator 101 are connected to pass a payload signal of wavelength $\lambda_i$ from the optical demultiplexer to TOF 103.

Optical splitter 128 has M output ports connected to M input ports of optical combiner 125 via optical delay lines $126_1$-$126_M$. In this embodiment, optical delay lines $126_1$, $126_2$, . . . , and $126_M$ respectively provide delay times of T, 2T, . . . , and MT. In other embodiments, the optical delay lines may provide a non-uniform distribution of delay times. In one embodiment, optical delay lines $126_1$-$126_M$ are implemented with optical fibers of different lengths. The output port of optical combiner 125 is connected to an input port of optical amplifier 123, which has an output port connected to one of two input ports of BOD 122. The other input port of BOD 122 is connected to receive an optical signal generated by a control laser 129. Control processor 82 is connected to TOF 103, photonic burst switches $32_1$-$32_B$, and to control laser 129 so that control processor 82 can control or monitor the operation of these elements. The operation of this portion of module 120 is described below in conjunction with FIG. 13.

Figure 13:
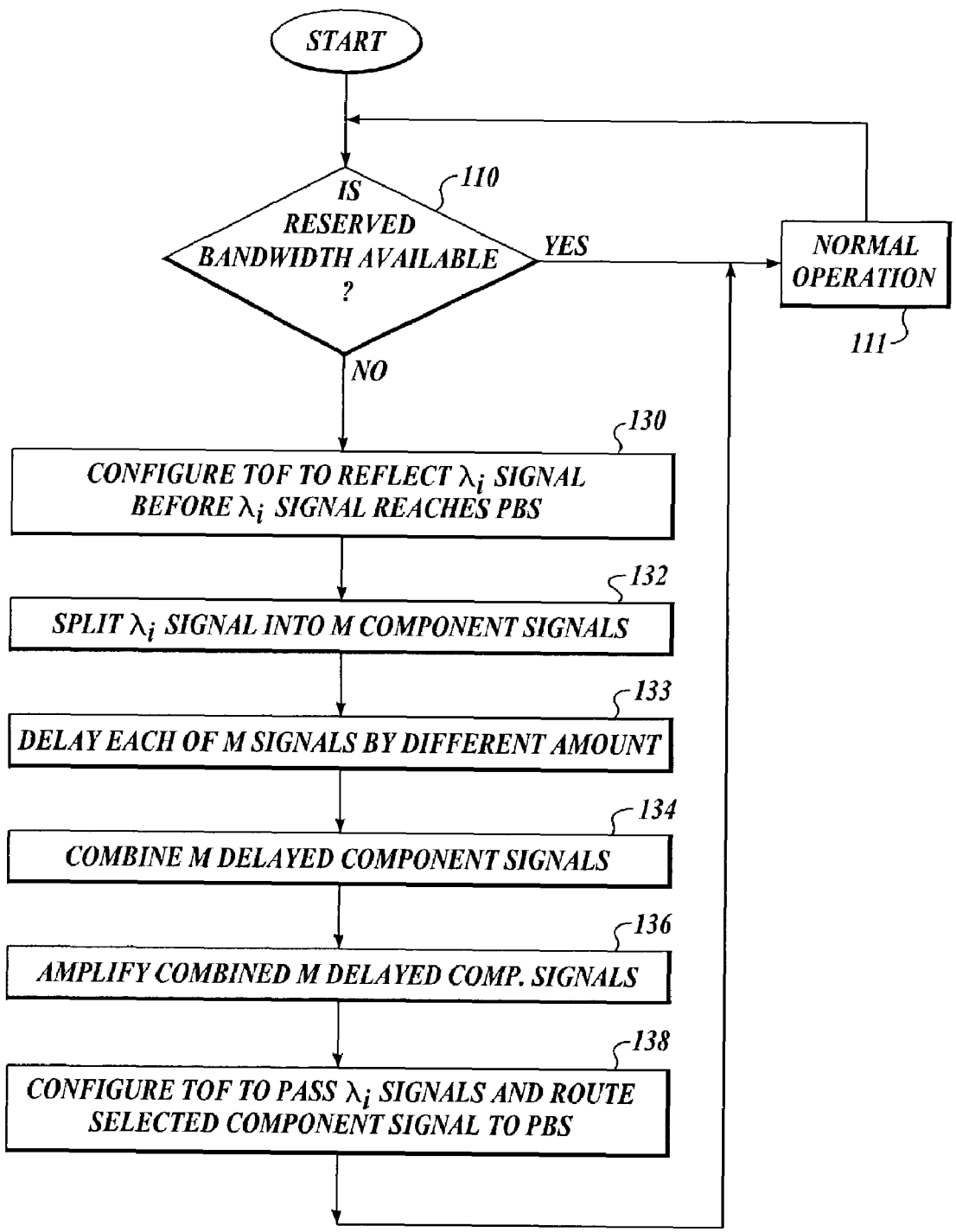
FIG. 13 is a flow diagram illustrating the operation of the core switching node module of FIG. 12, according to one embodiment of the present invention.

FIG. 13 illustrates the operational flow of a portion of module 120 (FIG. 12) having a VDOB, according to one embodiment of the present invention. Although the operation with respect to only one VDOB is described, the operation of module 120 with respect to the other VDOBs is substantially similar. Referring to FIGS. 12 and 13, this embodiment of module 120 operates as follows.

During operation, module 120 monitors the availability of reserved bandwidth (e.g., a TDM channel). In one embodiment, network processor 83 (FIG. 9) monitors the availability of reserved bandwidth and passes this information to control processor 82. For example, if a received label contains information reserving a particular TDM channel, network processor 83 (FIG. 9) would then determine whether photonic burst switches $32_1$-$32_B$ are available to be configured to provide the reserved TDM channel. In other embodiments, control processor 82 performs this operation directly. For example, control processor 82 may be implemented by processor 83 (FIG. 9). Block 110 represents this operation.

If the reserved TDM channel is available, module 120 operates as described above for module 17 (FIG. 8) to switch the payload signal within the reserved TDM channel. More specifically, the incoming optical payload signal (i.e., at wavelength $\lambda_i$) passes through coupler 100 and circulator 101 to TOF 103, which is configured to pass the incoming optical payload signal to photonic burst switches $32_1$-$32_B$ so that the incoming optical payload signal can be switched to the reserved TDM channel. Block 111 represents this operation.

However, if the TDM channel is not available, the incoming optical payload signal is reflected so that it does not reach the input ports of the photonic burst switches. In one embodiment, TOF 103 is configured to reflect the incoming payload signal back to circulator 101. In this embodiment, control processor 82 configures the photonic burst switches and TOF 103. A block 130 represents this operation.

However, if one or more packets of the incoming optical payload signal have already arrived at the input ports of the photonic bur switches before TOF 103 can be configured to reflect them, module 120 drops these packets and sends a message to the sending node to resend the dropped packets.

The reflected payload signal is then split into M component signals. In this embodiment, each of the component signals has essentially the same energy and phase. In this embodiment, optical splitter 128 receives the payload signal reflected by TOF 103 via circulator 101 and then splits this signal into M "equal" optical power component signals. A block 132 represents this operation.

The M component signals are then delayed, each by a different amount of time. In this embodiment, as previously described, optical delay lines $126_1$-$126_M$ provide delays of T, 2T, . . . , and MT to the M component signals. A block 133 represents this operation.

The delayed component signals are then combined. In this embodiment, optical combiner 125 combines the M component signals received from optical delay lines $126_1$-$126_M$. The duration of T is selected in one embodiment to be longer than a given minimum optical burst payload duration at a given wavelength (which typically depends on many parameters such as the specific traffic pattern, PBS network topology, number of wavelengths, etc.). In this way, the delayed component signals will not overlap when combined by optical combiner 125. A block 134 represents this operation.

The combined signal is then amplified. In this embodiment, optical amplifier 123 amplifies the combined signal. Any suitable optical amplifier can be used to implement optical amplifier 123. For example, a semiconductor optical amplifier (SOA) can be used. A block 136 represents this operation.

TOF 103 is then configured to pass signals of wavelength $\lambda_i$ and a selected component signal of the amplified combined signal is routed to the photonic burst switches. In one embodiment, control processor 82 controls TOF 103 to pass $\lambda_i$ wavelength signals and causes control laser 129 to output an optical signal to BOD 122. The intensity of the control laser signal is selected so that when combined with the output signal from optical amplifier 123, BOD 122 will, in effect, switch on and output the signal from optical amplifier 123, is transmitted through coupler 100.

Further, in this embodiment, control processor 82 calculates the delay time needed for the TDM channel to become free and then selects which of the M delayed component signals is sufficiently delayed so as to be available when the TDM channel becomes free. Control processor 82 then causes control laser 129 to generate its laser output signal so that BOD 122 will "gate" on and off the selected delayed component signal from optical amplifier 123 to coupler 100. A block 138 represents this operation. The operational flow then returns to block 111 (described previously in conjunction with FIG. 11).

Figure 14:
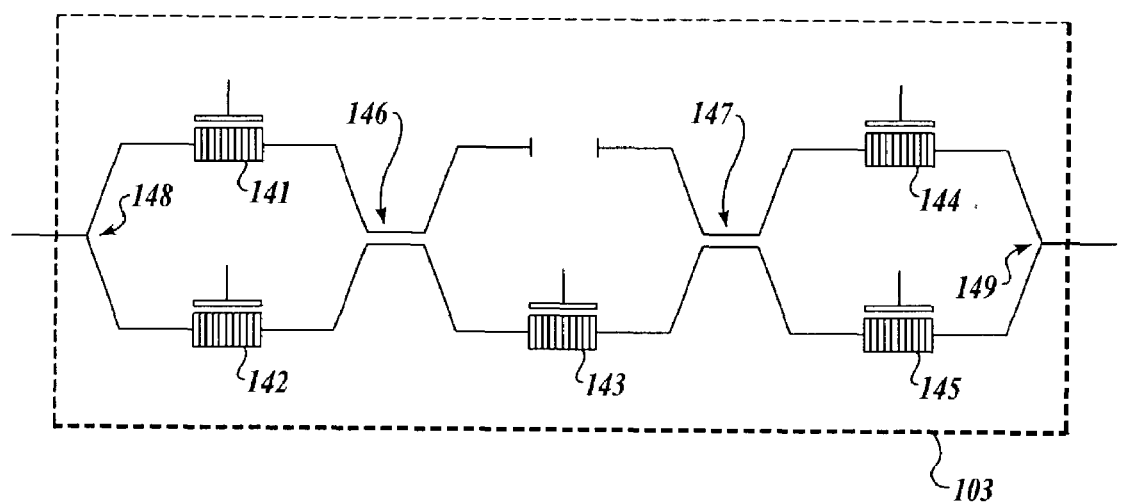
FIG. 14 is a block diagram illustrating a tunable optical filter for use in a core switching node module, according to one embodiment of the present invention.

FIG. 14 illustrates one embodiment of TOF 103 (FIGS. 10 and 12) implemented with semiconductor-based phase control elements, according to one embodiment of the present invention. In this embodiment, TOF 103 includes phase control elements 141-145 connected in a three-stage Mach Zehnder Interferometer (MZI) architecture using 2×2 3-dB couplers 146 and 147, and Y-couplers 148 149. One embodiment of phase control element 141 is described below in conjunction with FIGS. 15 and 16.

The elements of this embodiment of TOF 103 are interconnected as follows. Phase control elements 141-145 each have a control terminal coupled to control processor 82 (FIGS. 10 and 12). In addition, phase control elements 141 and 142 have input ports connected to corresponding output ports of Y-coupler 148. Y-coupler 148 has an input port connected to receive an input optical signal. In this embodiment, the input port of Y-coupler 148 is connected to a port of circulator 101 (FIGS. 12 and 14). The output ports of phase control elements 141 and 142 are connected to corresponding ports of 2×2 3-dB coupler 146. Another port of 2×2 3-dB coupler 146 is connected to an input port of phase control element 143, while the remaining port of 2×2 3-dB coupler 146 is terminated.

The output port of phase control element 143 is connected to one of the ports of 3-dB coupler 147. Further, 2×2 3-dB coupler 147 has another port that is terminated, another that is connected to an input port of phase control element 144, and another that is connected to an input port of phase control element 145. The output ports of phase control elements 144 and 145 are connected to corresponding ports of Y-coupler 149. The remaining port of Y-coupler 149 is an output port. In this embodiment, this output port is connected to photonic burst switches $32_1$-$32_B$.

In operation, control processor 82 provides control signals to the control terminals of phase control elements 141-145. For example, control processor 82 can provide the control signals directly or, alternatively, control switches that selectively connect the control terminals to reference voltage sources (not shown). The voltage levels of the control signals adjust the induced phase shift caused by the phase control elements as in a conventional MZI. For example, under one set of control signals, phase control elements 141 and 142 can be configured to induce an aggregate 0° relative phase shift between component signals (of wavelength $\lambda_i$) propagating through phase control elements 141 and 142. This causes TOF 103 to reflect signals have a wavelength of $\lambda_i$. The other MZI stages serve to further reduce any residual light that might that might "leak" through 2×2 3-dB coupler 146.

It is noted that when light having a wavelength different from $\lambda_i$ is received by TOF 103 under this set of control signals, the light passes through with relatively low optical loss. This feature is used in one embodiment to configure TOF 103 to pass signals of wavelength $\lambda_i$ as follows. To configure TOF 103 to pass $\lambda_i$ wavelength signals, control processor 82 causes the control signals to have a different levels (e.g., voltages), which in turn causes or "tunes" TOF 103 to reflect signals having a particular wavelength that is different from wavelength $\lambda_i$. Consequently, TOF 103 will pass signals having a wavelength of $\lambda_i$. An embodiment of phase control element 141 is described below in conjunction with FIGS. 15 and 16.

Figure 15:
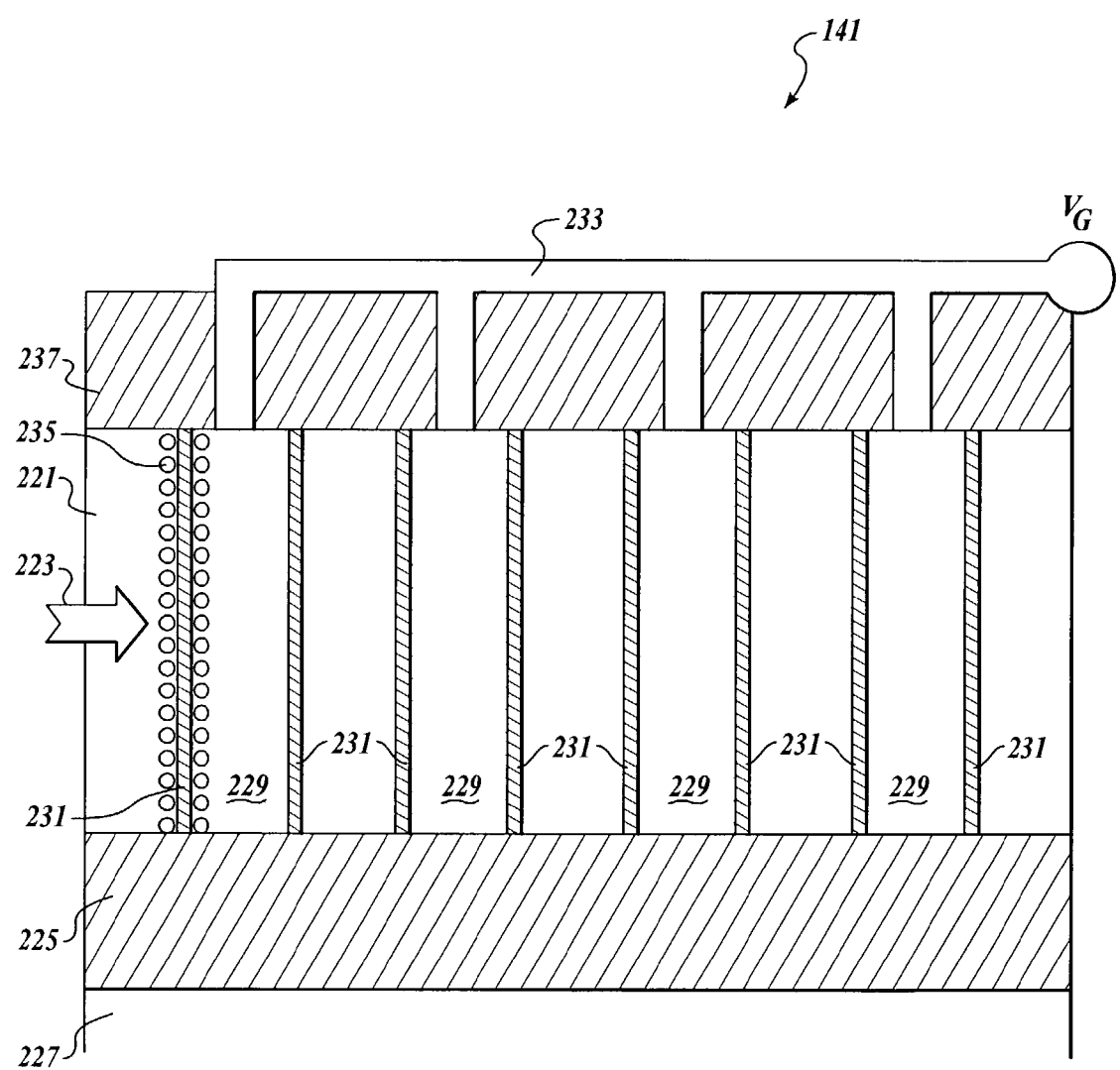
FIG. 15 is a diagram illustrating a cross-section of plasma optical effect-based silicon phase shifter, according to one embodiment of the present invention.

FIG. 15 illustrates a cross-section of optical phase control element 141, according to one embodiment of the present invention. In this embodiment, optical phase control elements 142-145 are essentially identical to optical phase control element 141. In one embodiment, several trench capacitors are formed with polysilicon regions 229 disposed in semiconductor substrate 221. In one embodiment, insulating regions 231 are disposed between polysilicon regions 229 and semiconductor substrate to form trench capacitors.

In one embodiment, the wafer on which phase control element is disposed is a silicon-on-insulator (SOI) wafer. Accordingly, a buried insulating layer 225 is disposed between semiconductor substrate 221 and semiconductor substrate 227 of the SOI wafer. In addition, semiconductor substrate 221 is disposed between buried insulating layer 225 and insulating layer 237. In one embodiment, insulating layer 237 is an interlayer dielectric layer of the wafer on which phase control element 141 is disposed.

In one embodiment, an optical waveguide, such as for example rib waveguide, is disposed in semiconductor substrate 221 between insulating layers 237 and 225. As such, optical beam 223 is illustrated in FIG. 15 propagating from left to right. In one embodiment, optical beam 223 includes infrared or near infrared laser light. As mentioned, in one embodiment, semiconductor substrate 221 includes silicon. As known to those skilled in the art, silicon is partially transparent to infrared or near infrared light. For instance, in one embodiment in which phase control element 141 is utilized in telecommunications, optical beam 223 has an infrared wavelength in the range of approximately 1300 to 1550 nanometers. In one embodiment, insulating layers 225 and 237 include an oxide material. The oxide material has a smaller index of refraction that silicon and polysilicon; therefore, optical beam 223 is confined within the waveguide between insulating layers 225 and 237 as a result of total internal reflection.

As shown in the embodiment of FIG. 15, polysilicon regions 229 are coupled to receive a control signal $V_G$ through conductors 233 routed through insulating layer 237. In the depicted embodiment, the trench capacitors formed by polysilicon regions 229 in semiconductor substrate 221 are biased in response the control signal $V_G$ such that the concentration of free charge carriers in charged regions 235 is modulated. For instance, in one embodiment, when control signal $V_G$ is varied, injected free electrons and holes included in charge regions 235 accumulate at the interfaces between the polysilicon regions 229 and insulating regions 231 and at the interfaces between semiconductor substrate 221 and insulating regions 231. Accordingly, as optical beam 223 propagates through the waveguide between insulating layers 225 and 237, optical beam 223 propagates through the modulated charged regions 235.

In one embodiment, the phase of optical beam 223 that passes through the charged regions 235 is modulated in response to control signal $V_G$. In one embodiment, the phase of optical beam 223 passing through free charge carriers in charged regions 235 is modulated due to the plasma optical effect. The plasma optical effect arises due to an interaction between the optical electric field vector and free charge carriers that may be present along the propagation path of the optical beam 223. The electric field of optical beam 223 induces a change in the velocity of the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part, which causes the velocity change and the imaginary part being related to the free charge carrier absorption. In this embodiment, the amount of phase shift $\phi$ is determined using the equation:

$$\phi = (2\pi/\lambda)\Delta n \cdot L \quad (1)$$

where $\lambda$ is the optical wavelength in vacuum and L is the interaction length.

In the case of the plasma optical effect in silicon, the refractive index change $\Delta n$ due to the electron ($\Delta N_e$) and hole ($\Delta N_h$) concentration change (which depends on control signal $V_G$ as described above) is determined in this embodiment using the equation:

$$\Delta n = -\frac{e^2\lambda^2}{8\pi^2 c^2 \varepsilon_0 n_0}\left(\frac{\Delta N_e}{m_e^*} + \frac{\Delta N_h}{m_h^*}\right) \quad (2)$$

where $n_0$ is the nominal index of refraction for silicon, e is the electronic charge, c is the speed of light $\varepsilon_0$ is the permittivity of free space, $m_e^*$ and $m_h^*$ are the electron and hole effective masses, respectively.

It is noted that four trench capacitors have been illustrated in FIG. 15 for explanation purposes with polysilicon regions 229 disposed in semiconductor substrate 221. Other embodiments may have a greater or fewer number of trench capacitors in accordance with the teachings of the present invention, with the number of trench capacitors chosen to achieve the required phase shift. In particular, the interaction length L discussed in connection with Equation (1) above may be varied by increasing or decreasing the total number of trench capacitors of phase control element 141.

Figure 16:
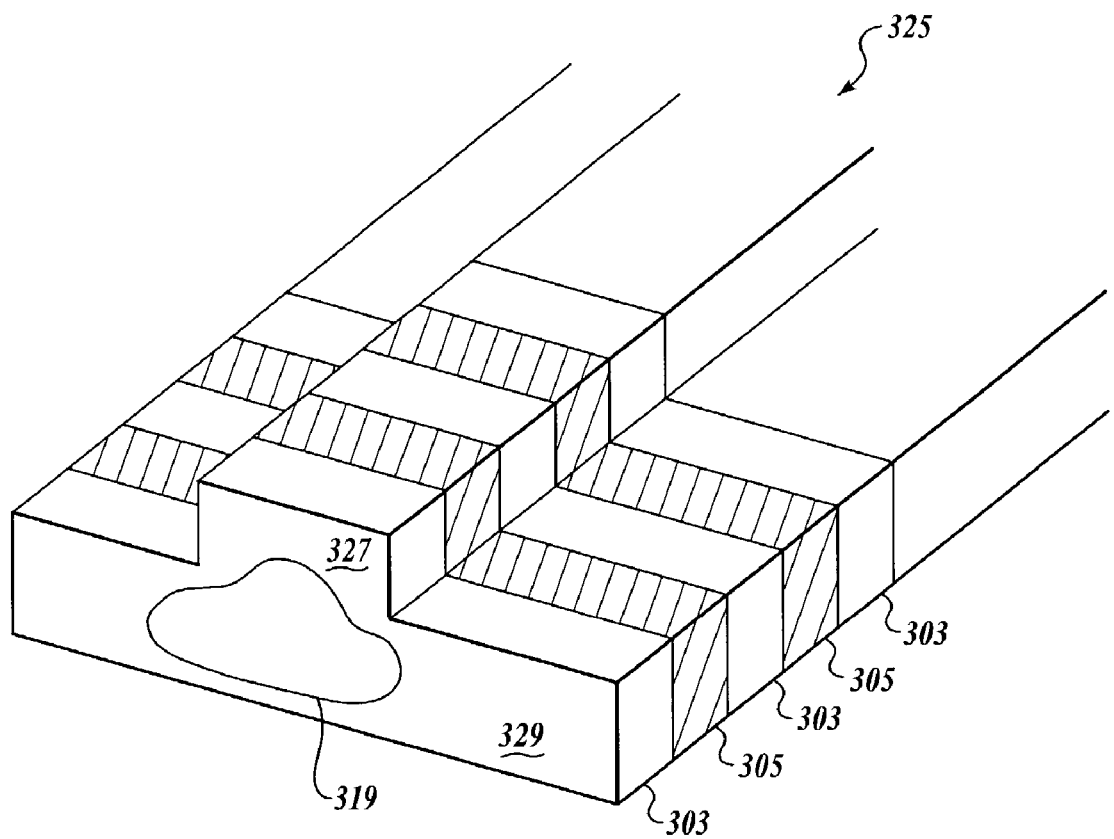
FIG. 16 is a diagram illustrating a perspective view of ridge-waveguide plasma optical-effect silicon phase shifter implementation of the phase shifter depicted in FIG. 15, according to one embodiment of the present invention.

FIG. 16 is a diagram illustrating a perspective view of a portion of silicon-based phase control element that can be used to implement phase control element 141 (FIG. 15), according to one embodiment of the present invention. In this embodiment, the phase control element is implemented using a rib waveguide 325. Rib waveguide 325 is disposed between insulating regions (not shown), similar to insulating regions 225 and 227 in FIG. 15. Conductors 233 (FIG. 15) are also omitted from FIG. 16 for clarity in describing the rib waveguide.

Rib waveguide 325 is disposed in a semiconductor material 303 and includes regions of polysilicon 305. In one embodiment, the semiconductor material 303 has a different index of refraction than polysilicon 305 such that periodic or quasi-periodic perturbations in an effective index of refraction are provided along an optical path through rib waveguide 325.

As shown, rib waveguide 325 includes a rib region 327 and a slab region 329. In the embodiment illustrated in FIG. 3, the intensity distribution 319 of a single mode optical beam is shown propagating through the rib waveguide 325. As shown, the intensity distribution 319 of the optical beam is such that of the majority of the optical beam propagates through a portion of rib region 327 towards the interior of the rib waveguide 325. In addition, a portion of the optical beam propagates through a portion of slab region 329 towards the interior of the rib waveguide 325. As also shown with the intensity distribution 319 of the optical beam, the intensity of the propagating optical mode of the optical beam is vanishingly small at the "upper corners" of rib region 327 as well as the "sides" of slab region 329. This ridge waveguide shape allows rib waveguide 325 to support single mode propagation.

Figure 17:
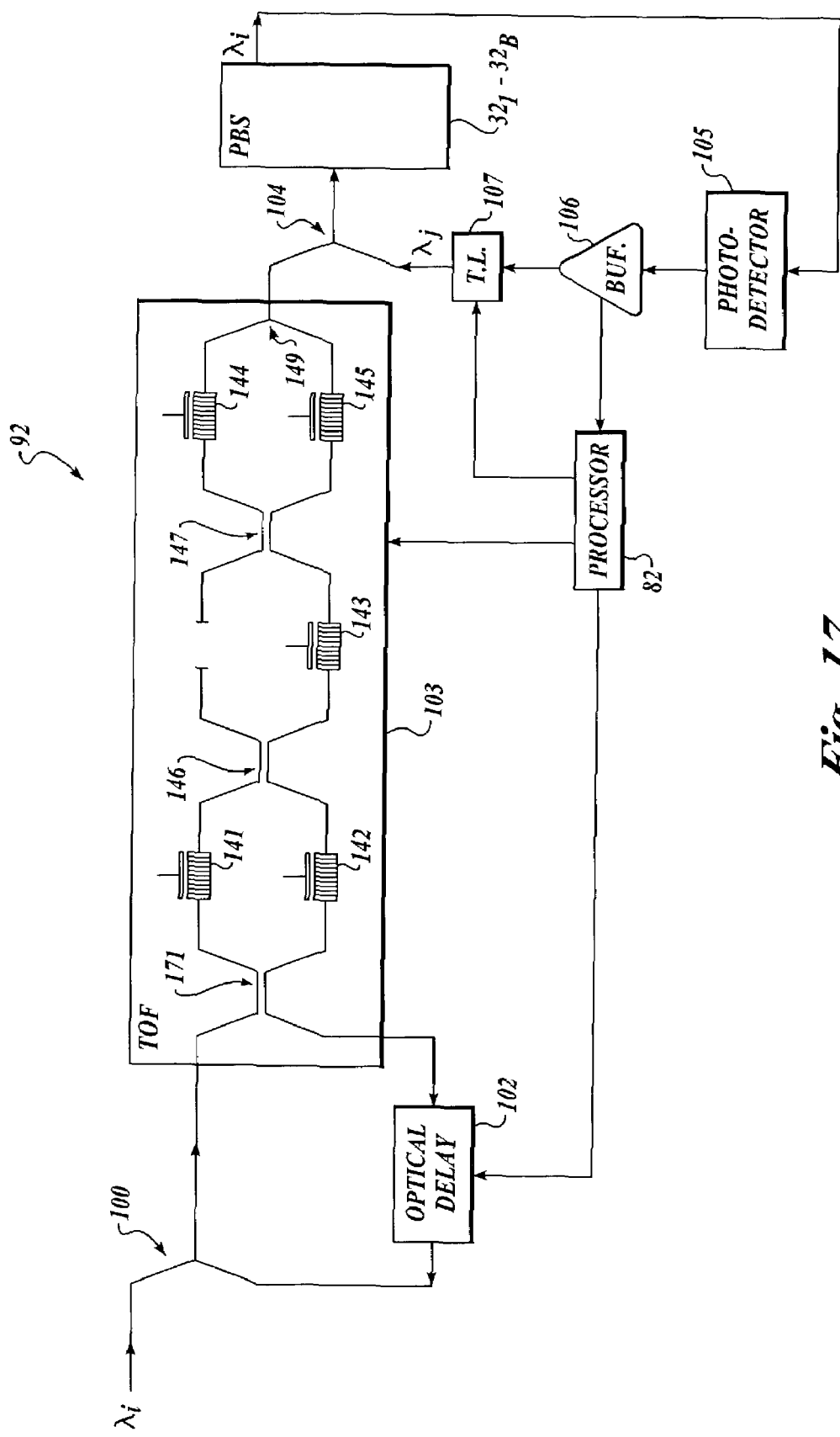
FIG. 17 is a block diagram illustrating a portion of the core switching node module with an optical buffer of FIG. 9, according to a second embodiment of the present invention.

FIG. 17 illustrates a TWC 92 in a portion of module 90 (FIG. 9), according to another embodiment of the present invention. In this embodiment, the TWC 92 is substantially similar to the embodiment of FIG. 10, except that circulator 101 is omitted. In addition, in this embodiment, TOF 103 is substantially similar to the embodiment of FIG. 14 except that Y-coupler 148 (FIG. 14) and circulator 101 (FIGS. 10 and 12) are replaced with a 2×2 3-dB coupler 171.

More specifically, coupler 100 is connected to one input port of TOF 103 while the other input port of TOF 103 is connected to optical delay 102. The other elements of this embodiment of TWC 92 are interconnected as in the embodiment of FIG. 10.

This embodiment operates in essentially the same manner as described above in conjunction with FIGS. 10 and 11, except that circulator 101 is not used. Thus, an optical signal can pass from coupler 100 directly to TOF 103 (instead of through circulator 101). Similarly, an optical signal reflected by TOF 103 passes directly to optical delay 102 via the aforementioned second input port of TOF 103 (instead of through circulator 101).

Figure 18:
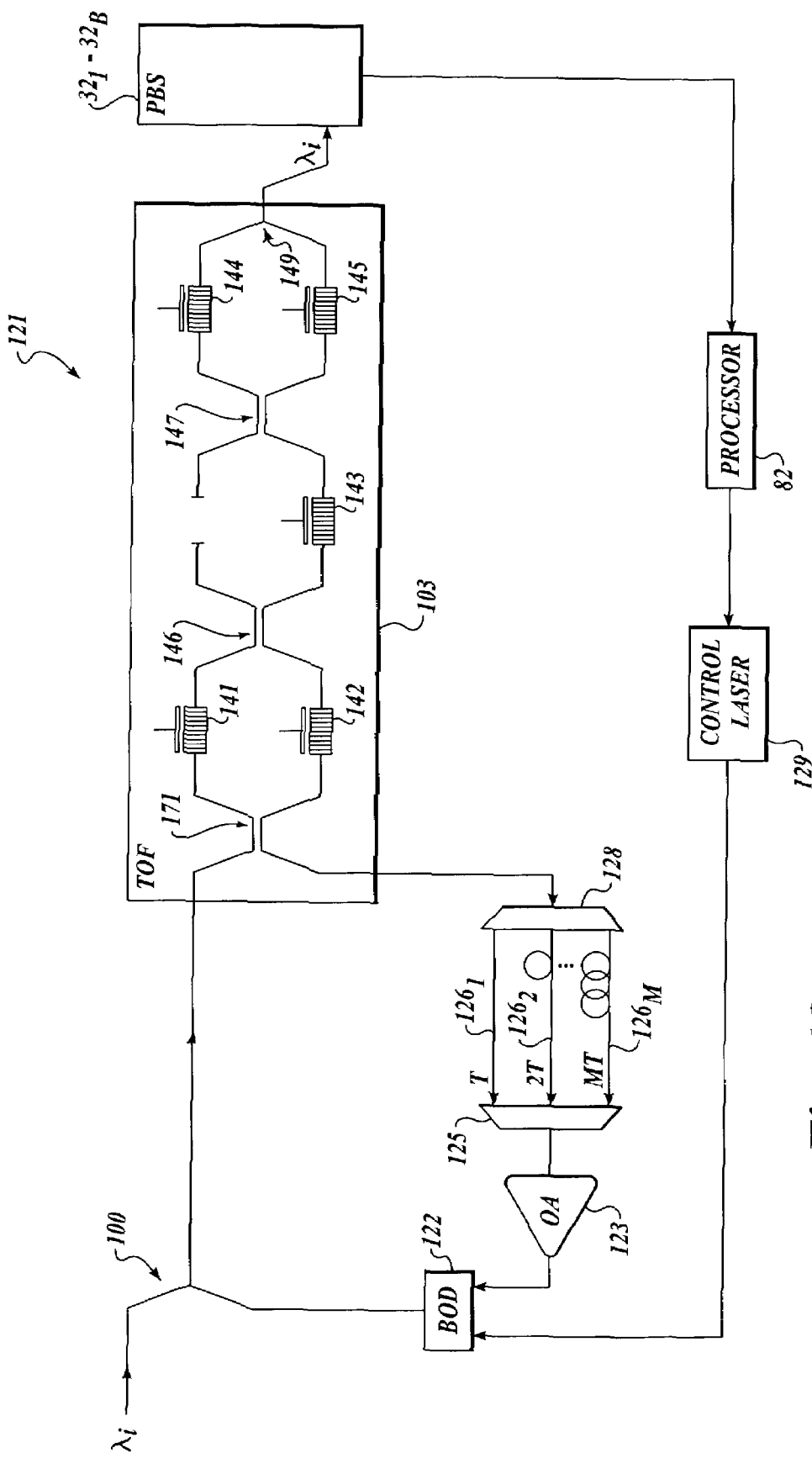
FIG. 18 is a block diagram illustrating a core switching node module with a variable delay optical buffer, according to a second embodiment of the present invention.

FIG. 18 illustrates a VDOB 121 (FIG. 12), according to another embodiment of the present invention. As in the embodiment of TWC 92 (FIG. 17), this embodiment of VDOB 121 omits circulator 101 and implements TOF 103 with a 2×2 3-dB coupler 171 instead of Y-coupler 148 (FIG. 14}. Thus, TOF 103 is connected directly to coupler 100 and optical splitter 128 instead of through a circulator.

This embodiment of VDOB 121 operates in essentially the same manner as described above in conjunction with FIGS. 12 and 13, except that circulator 101 is not used. Thus, an optical signal can pass from coupler 100 directly to TOF 103 (instead of through circulator 101). Similarly, an optical signal reflected by TOF 103 passes directly to optical splitter 128 via the aforementioned second input port of TOF 103 (instead of through circulator 101).

Embodiments of method and apparatus for implementing an photonic burst switching network are described herein. In the above description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, embodiments of the invention have been described. It will, however, be evident that various modifications and changes may be made thereto without departing from the broader spirit and scope as set forth in the appended claims. The specification and drawings are, accordingly, to be regarded in an illustrative rather than a restrictive sense.

What is claimed is:

1. A system comprising:
a control interface (CIF) unit having a control processor to receive network management control labels from an optical switching network and a network processor to receive optical label signals;
a photonic burst switch (PBS) coupled to the CIF;
a plurality of tunable wavelength converters (TWCs) coupled to the PBS, each TWC comprising a first coupler, an optical delay unit coupled to the first coupler, a second coupler coupled to an input port of the PBS, and a tunable optical filter (TOF) coupled to the first coupler, the optical delay unit, and the second coupler;
an optical demultiplexer (DMUX) coupled to the PBS via the plurality of TWCs, the DMUX to route the optical label signal and an associated optical data signal to the network processor of the CIF unit and the PBS, respectively, the optical data signal being a time division multiplexed (TDM) signal sent after the optical label signal, the optical label signal containing information for routing the optical data signal; and
an optical multiplexer (MUX) coupled to the PBS and to a plurality of optical output lines that provide propagation paths for a plurality of TDM channels,
the CIF unit to process the routing information in the network management control label and the optical label signal to cause the PBS to route the optical data signal to a first one of the plurality of TDM channels.

2. The system of claim 1 wherein the CIF unit is further to process the network management control label and the optical label signal to form a new label and to route the new label to the MUX for routing in association with the optical data signal.

3. The system of claim 1, wherein, the CIF is further to cause a TWC of the plurality of TWCs to provide a second data signal having a wavelength different from that of the optical data signal when the first TDM channel is not available, the second data signal containing at least a first portion of data contained in the optical data signal.

4. The system of claim 3, wherein the CIF is further to drop one or more packets of the optical data signal when the optical data signal arrives at the system before the CIF configures the TWC.

5. The system of claim 4, wherein the CIF further provides an indication to a source of the optical data signal to resend the dropped packets.

6. The system of claim 1, wherein the TWC further includes a circulator to couple the first coupler, the second coupler and the optical delay unit.

7. The system of claim 1, wherein the optical delay unit comprises a Fabry-Perot etalon.

8. The system of claim 1, wherein the tunable optical filter comprises a semiconductor phase shifting element having alternating layers of materials having different refractive indices.

9. The system of claim 1, wherein the TWC further includes:
a photodetector coupled to a spare output port of the PBS;
a buffer coupled to the photodetector;
a tunable laser coupled to the buffer and the second coupler, the tunable laser to output an optical signal having a wavelength different from that of the optical data signal; and
a processor to configure the PBS to route the first portion of the optical data signal to the spare output port of the PBS when the first TDM channel is not available.

10. The system of claim 9, wherein the processor is part of the network processor of the CIF unit.

11. The system of claim 9, wherein the buffer is configurable to electrically store data of the first data portion, the electrically stored data being used to modulate the optical signal output by the tunable laser.

12. The system of claim 9, wherein the TOF is configured to reflect a second portion of the optical data signal when the first TDM channel is not available.

13. The system of claim 12, wherein the reflected second portion of the optical data signal propagates through the circulator to the optical delay unit, which outputs the delayed second portion of the optical data signal to the TOF via the first coupler.

14. The system of claim 1, wherein when the system has a fault, an indication is provided to the WDM optical switching network which in response thereto selectively reroutes the optical label and optical data signals to bypass the faulty system.

15. A wavelength-division multiplexed (WDM) optical switching network comprising:
an ingress module;
an egress module; and
a plurality of core modules coupled to the ingress and egress modules, wherein each core module of the plurality of core modules includes:
a switch having a plurality of tunable wavelength converters (TWCs), each TWC comprising a first coupler, an optical delay unit coupled to the first coupler, a second coupler coupled to an input port of the PBS, and a tunable optical filter (TOF) coupled to the first coupler, the optical delay unit, and the second coupler, the switch to receive an optical control signal and an associated optical data signal on different ones of a plurality of time division multiplexed (TDM) optical input lines, and to route the optical data signal on one of a plurality of TDM optical output lines; and
route an optical control signal received via a plurality of optical input lines to a plurality of TDM channel output lines, the optical data signal being a TDM signal sent after the optical control signal, the optical control signal containing information for routing the optical data signal; and an associated optical data signal and
a control unit coupled to the switch, to receive the optical control signal from the switch and based on routing information in the optical control signal and in a network management control label received from a network controller to cause the switch to route the optical data signal to a first one of a plurality of TDM output channels.

16. The network of claim 15, wherein the control unit causes the switch to route the optical data signal to the first TDM output channel if the first TDM output channel is available.

17. The network of claim 15, wherein the control unit is further to perform optical-electrical-optical conversion of the optical control signal.

18. The network of claim 15, wherein a TWC of the plurality of TWCs is further to cause at least a first portion of the optical data signal to be propagated on an optical signal of a wavelength different from that of the optical data signal when the first TDM channel is not available and the optical data signal is received after the TWC is configured.

19. The network of claim 15, wherein one or more packets of the optical data signal are dropped when the optical data signal is received before the TWC is configured.

20. The network of claim 15, wherein the control unit is further to process the network management control label and the optical label signal to form a new label and to route the new label on a TDM output channel.

21. The network of claim 15, wherein the TWC further includes:
a photodetector;
a buffer coupled to the photodetector; and
a tunable laser coupled to the buffer and the second coupler, the tunable laser to output an optical signal having a wavelength different from that of the optical data signal,
and wherein the control unit further comprises a processor to configure the switch to route the first portion of the optical data signal to the spare output port of the switch when the first TDM channel is not available.

22. The system of claim 21, wherein the TDM is configured to reflect a second portion of the optical data signal when the first TDM channel is not available.

23. The system of claim 21, wherein the reflected second portion of the optical data signal propagates through the circulator to the optical delay unit, which outputs the delayed second portion of the optical data signal to the TOF via the first coupler.

* * * * *